United States Patent [19]
Marrocco, III et al.

[11] Patent Number: 5,227,457
[45] Date of Patent: Jul. 13, 1993

[54] RIGID-ROD POLYMERS

[75] Inventors: Matthew L. Marrocco, III, Santa Ana; Robert R. Gagné; Mark S. Trimmer, both of Pasadena, all of Calif.

[73] Assignee: Maxdem Incorporated, San Dimas, Calif.

[21] Appl. No.: 397,732

[22] Filed: Aug. 23, 1989

Related U.S. Application Data

[63] Continuation-in-part of Ser. No. 157,451, Feb. 17, 1988, abandoned.

[51] Int. Cl.$^5$ ............... C08G 61/10; C08G 69/26; C08G 73/10; C08G 73/22; C08G 75/32; C08L 65/02
[52] U.S. Cl. .................... 528/183; 528/337; 528/341; 528/348; 528/353; 528/397; 525/420; 525/436; 525/534
[58] Field of Search ............... 528/422, 397, 396, 271, 528/183, 337, 341, 348, 353; 525/420, 436, 534

[56] References Cited

U.S. PATENT DOCUMENTS

| | | | |
|---|---|---|---|
| 3,431,221 | 3/1969 | Hoess | 260/2 |
| 3,826,783 | 7/1974 | Bloch | 260/47 |
| 4,108,835 | 8/1978 | Arnold et al. | 528/183 |
| 4,108,942 | 8/1978 | Chalk et al. | 260/875 |
| 4,207,407 | 6/1980 | Helminiak et al. | 525/425 |
| 4,229,566 | 10/1980 | Evers et al. | 528/185 |
| 4,263,466 | 4/1981 | Colon et al. | 585/421 |
| 4,284,834 | 8/1981 | Austin et al. | 585/25 |
| 4,326,989 | 4/1982 | Colon et al. | 252/429 |
| 4,377,546 | 3/1983 | Helminiak et al. | 264/232 |
| 4,384,107 | 5/1983 | Rogers et al. | 528/183 |
| 4,393,194 | 7/1983 | Guadiana et al. | 528/348 |
| 4,400,499 | 9/1983 | Colon | 528/274 |
| 4,433,132 | 2/1984 | Rogers et al. | 528/191 |
| 4,454,307 | 6/1984 | Cheshire | 525/379 |
| 4,461,886 | 7/1984 | Rogers et al. | 528/331 |
| 4,486,576 | 12/1984 | Colon et al. | 525/471 |
| 4,503,248 | 3/1985 | Gaudiana et al. | 564/307 |
| 4,511,623 | 4/1985 | Yoon et al. | 428/359 |
| 4,520,189 | 5/1985 | Rogers et al. | 528/331 |
| 4,525,413 | 6/1985 | Rogers et al. | 428/212 |
| 4,595,811 | 7/1971 | Bilow | 260/2 |
| 4,606,875 | 8/1986 | Chenevey et al. | 264/85 |
| 4,608,429 | 8/1986 | Rogers et al. | 528/194 |
| 4,614,784 | 9/1986 | Kozakiewicz | 527/313 |
| 4,628,125 | 4/1985 | Rogers et al. | 568/730 |
| 4,629,777 | 12/1986 | Pfeifer | 528/353 |
| 5,102,971 | 4/1992 | Himmler et al. | 528/167 |

FOREIGN PATENT DOCUMENTS

| | | | |
|---|---|---|---|
| 1129418 | 8/1982 | Canada | 260/279.6 |
| 3821567 | 12/1989 | Fed. Rep. of Germany | |

OTHER PUBLICATIONS

Jerry March, Advanced Organic Chemistry (1977) pp. 386-387.
Guide to Plastics, McGraw-Hill, Inc. N.Y., N.Y. (1981) pp. 191-193.
Sutherlin et al, "Rigid-Rod Polyquinolines with Extended Aryl Ether Pendent Groups: An Approach to Solubility Enhancement," Macromolecules 18, No. 12, 2669-2675 (1985).
Mukamal et al, "Diels-Alder Polymers. III. Polymers Containing Phenylated Phenylene Units," Journal of Polymer Science: Part A-1, vol. 5, 2721-2729 (1967).
Wolfe et al, "Rigid-Rod Polymers. 1. Synthesis and Thermal Properties of Para-Aromatic Polymers with (List continued on next page.)

Primary Examiner—James J. Seidleck
Assistant Examiner—Vasu S. Jagannathan
Attorney, Agent, or Firm—Christie, Parker & Hale

[57] ABSTRACT

High-performance polymers having a rigid-rod backbone comprising a chain length of at least 25 organic monomer units joined together by covalent bonds wherein at least about 95% of the bonds are substantially parallel; and solubilizing organic groups attached to at least 1% of the monomer units. The polymers are prepared in a solvent system which is a solvent for both the monomer starting materials and the rigid-rod polymer product.

37 Claims, No Drawings

OTHER PUBLICATIONS 2,6–Benzobisoxazole Units in the Main Chain," Macromolecules, 14, 909–915 (1981).

Stille et al, "Diels–Alder Polymers: Polyphenylenes Containing Alternating Phenylene and Triphenylphenylene Units," J. Polym. Sci., Part B, 7, 525 (1969).

Dicke et al, "Liquid Crystal Polymers, 14. Synthesis and Properties of Thermotropic Poly(1,4–Alkylphenylene Terephthalates)," Journal of Polymer Science, 21, 8, Aug. 1983, pp. 2581–2588.

Braham et al, "Polyphenylenes vis Bis(2–pyrones) and Diethynylbenzenes, The Effect of m– and p–Phenylene Units in the Chain," Macromolecules, vol. 11, No. 2, 343, Mar.–Apr. 1978.

Chou et al, "Composites," Scientific American, Oct. 1986, pp. 193–202.

Schilling et al, "Diels–Alder Polymerizations. VI. Phenylated Polyphenylenes from Bis-2-pyrones and p–Diethynylbenzene," Macromolecules, vol. 2, No. 1, Jan.–Feb. 1969.

Zhou et al, "Liquid Crystal Polymers. 15. Synthesis and Liquid Crystalline Properties of Alkyl–Substituted Polyesters," Journal of Polymer Science: Polymer Chemistry Edition, vol. 21, 3313–3320 (1983).

Lenz, R. W., "Structure–Order Relationships in Liquid Crystalline Polyesters," Pure and Applied Chemistry, Vol. 57, No. 11, pp 1537–1544 (1985).

Zhou et al, "Liquid Crystal Polymers. 17. Thermotropic Properties of Random Copolyesters of Monotropic and Enantiotropic Polymers," Canadian Journal of Chemistry, vol. 63, pp. 181–183, (1985).

Ballauff "Rigid Rod Polymers having Flexible Side Chains. 1. Thermotropic Poly(1,4–phenylene 2,5–dialkoxyterephthalate)s, " Makromol. Chem., Rapid Commun., vol. 7, pp. 401–414 (1986).

Reck et al, "Combined Liquid-Crystalline Polymers: Rigid Rod and Semi-Flexible Main Chain Polyesters with Lateral Mesogenic Groups," Makromol. Chem., Rapid Commun., vol 7, pp. 389–396 (1986).

Krigbaum et al, "Nematogenic Polymers Having Rigid Chains. 1. Substituted Poly(p-phenylene terephthalates)," Macromolecules, 18, 965–973 (1985).

Hwang et al, "Composites on a Molecular Level: Phase Relationships, Processing, and Properties," J. Macromolecules Sci. Phys., B22(2), 231–257 (1983).

Hwang et al, "Solution Processing and Properties of Molecular Composite Fibers and Films," Polymer Engineering and Science, Mid-Oct. 1983, vol. 23, No. 14, pp. 784–788.

Wellman et al, "Rodlike Polymer Reinforcement of an Amorphous Polymer Matrix, AB-PBI/PBT," ACS Organic Cost. Plast. Chem., 93, 783 (1980).

Hwang et al, "Molecular Composites of Rigid Rod Poly-P-Phenylenebenzobisthiazole (PPBT) in Thermoplastic Matrices," Organic Coatings and Applied Polym Science Proceedings, vol. 48, pp. 929–933 (1983).

Hergenrother et al, "Phenyl-Substituted Polyquinoxalines, " Journal of Polymer Science: Part A-1, vol. 5, 1453–1466 (1967).

Wolfe et al, "Rigid-Rod Polymers. 2. Synthesis and Thermal Properties of Para-Aromatic Polymers with 2,6-Benzobisthiazole Units in the Main Chain," Macromolecules, 14, 915–920 (1981).

Hergenrother, P., "Polyphenylquinoxalines: Synthesis, Characterization, and Mechanical Properties," Journal of Applied Polymer Science, vol. 18, pp. 1779–1791 (1974).

Harris et al, "Soluble Aromatic Polyimides From Phenylated Dianhydrides," J. Sci., Polym. Lett. Ed., 13, 1975, pp. 283–285.

Reinhardt et al, "Pendant Oxy and Thioarylene Aromatic Heterocyclic Polymers," Polym. Prepr. (Am. Chem. Soc., Div. Polym. Chem.) 23 (2), 119 (1982).

Gordon et al, "Thermally Stable Block Copolymers: A Potential Route to Molecular Composites," Polymer Preprints, American Chemical Society, Division of Polymer Chemistry, 27: 1, 311–312 (1986).

Yamamoto et al, "A Novel Type of Polycodensation Utilizing Transition Metal-Catalyzed C-C Coupling. I. Preparation of Thermostable Polyphenylene Type Polymers," Bulletin of the Chemical Society, vol. 51, No. 7, Jul. 1978.

Lindow et al, "Pyrolysis of Biphenylene," JACS, 89, 1271 (1967).

Friedman et al, "Electron Impact and Thermal Fragmentation of Biphenylene," JACS, 90, 2321 (1968).

Marvel et al, "Preparation and Aromatization of Poly-1,3-cyclohexadine," JACS, 81, 448 (1959).

Stille et al, "Poly(p-phenylene)," Macromolecules, 4, 515 (1971).

(List continued on next page.)

OTHER PUBLICATIONS of Zinc Powder," *Tetrahedron Letters,* 4089–4092 (1977).

Rogers et al, "Highly Amorphous, Birefringent, Para—Linked Aromatic Polyamides," *Macromolecules, 18,* 1058–1068 (1985).

Harris et al, "Synthesis and Characterization of Polyimides Based on 3,6-Diphenylpyromellitic Dianhydride," *High Perf. Pol.,* 1, 3–16 (1989).

Colon et al, "Coupling of Aryl Chlorides by Nickel and Reducing Metals," *J. Org. Chem.,* 51, 2627–2637 (1986).

Beever et al, "Synthesis and Thermal Properties of Aromatic Polymers Containing 3,6-Quinoline Units in the Main Chain,"0 *Macromolecules,* 12, 1033–1038 (1979).

Stille et al, "Polyquinolines Containing Fluoroene and Anthrone Cardo Units: Synthesis and Properties," *Macromolecules,* 14, 486–493 (1981).

Norris et al, "Synthesis and Solution Properties of Phenylated Polyquinolines," *Macromolecules,* 9, 496–505 (1976).

Beever et al, "Polyquinolines: A Class of Rigid-Chain Polymers," *J. Pol. Sci.: Pol. Sym.,* 65, 41–53 (1978).

Sybert et al, "Synthesis and Properties of Rigid-Rod Polyquinolines," *Marcomolecules,* 14, 493–502 (1981).

Stille et al, "Polyquinolines," *Macromolecules,* 14, 870–880 (1981).

Conference Report, "Specialty Polymers"—3rd Int'l Conference on New Polymeric Materials, Sep. 13–15, 1988.

Rehahn et al, "Soluble poly(para-phenylene)s. 1. Ex-

Satoh et al, "Properties of Highly Conducting Poly(-p-phenylene) Film Prepared by an Electrochemical Method," Polymer Communications, 26, 396 (1985).

Ballard et al, "Biotech Route to Polyphenylene," J. Chem. Soc., Chem Commun., 954 (1983).

Jones et al, "Polymerization of Aromatic Nuclei. XXVI. Poly(p-Phenylene): Friedel-Crafts Alkylation, Molecular Weight, and Propagation Mechanism," J. Polym. Sci., Polym. Chem. Ed., 19, 89 (1981).

LeBerre et al, "Electrochemical Polymerization of Paradialkoxybenzenes. Part 1. Anodic Oxidation of Paradimethoxybenzene in Dry Acetonitrile," J. Electroanal. Chem., 218, 173 (1987).

Kirk-Othmer, Encyclopaedia of Chemical Technology, 18, 704–719 (Polyimides).

Sales Brochure entitled "Polyphenylene Precursor PPP1," Imperial Chemical Industries PLC, Runcorn Cheshire, England (4 pp.).

Zembayashi et al, "Nickel Phosphine Complex-Catalyzed Homo Coupling of Aryl Halides in the Presence tension of the Yamamoto synthesis to dibromobenzenes substituted with flexible side chains," Polymer, 30, 1054–1059 (1989).

Rehahn et al, "Soluble poly(para-phenylene)s. 2. Improved synthesis of poly(para-2,5-di-n-hexylphenylene) via Pd-catalysed coupling of 4-bromo-2,5-di-n-hexylbenzeneboronic acid," *Polymer,* 30, 1060–1062 (1989).

Rehahn et al, "A High-Yield Route to 2,5-Di-n-alkyl-1,4-benzenedicarboxylic Acids," *Synthesis,* 386–388 (1988).

RIGID-ROD POLYMERS

RELATED APPLICATION

This application is a continuation-in-part of U.S. patent application Ser. No. 07/157,451, filed Feb. 17, 1988, now abandoned which is incorporated herein by this reference.

FIELD OF THE INVENTION

This invention relates to soluble rigid-rod polymers having rigid-rod backbones and pendant, flexible, solubilizing organic groups attached to the backbone. The polymers can be used as self-reinforced engineering plastics. The rigid-rod polymers can be utilized for the preparation of high tensile strength molecular composites of rigid-rod polymers and flexible coiled polymer binders. They can be used as matrix resins for fiber-containing composites.

BACKGROUND OF THE INVENTION

High-performance fiber-polymer composites are rapidly achieving a prominent role in the design and construction of military and commercial aircraft, sports and industrial equipment, and automotive components. Composites fill the need for stiffness, strength, and low weight that cannot be met by other materials. The most widely utilized high-performance fiber-polymer composites are composed of oriented carbon (graphite) fibers embedded in a suitable polymer matrix. To contribute reasonable strength and stiffness to the composite, the fibers must have an aspect ratio (length to width) of at least 25, and preferably of at least 100. Fabricating fiber-containing composites requires significant manual labor. Fiber-polymer composites cannot be recycled, and it is difficult to repair defective and/or damaged composite materials.

Molecular composites offer the prospect of being high-performance materials which are much more economical and easier to process than the conventional fiber-polymer composite. In addition, molecular composites can be recyclable and will be repairable. Molecular composites are composed of polymeric materials only. They contain no fiber material. Thus, molecular composites can be fabricated much more simply than fiber-polymer compositions which contain macroscopic fibers.

Molecular composites are materials composed of a rigid-rod polymer embedded in a flexible polymer matrix. The rigid-rod polymer can be thought of as the microscopic equivalent of the fiber in a fiber-polymer composite. Molecular composites with the optimum mechanical properties will contain a large fraction, at least 30 percent, of rigid-rod polymers, with the balance being polymeric binder. Molecular composites may contain either oriented or unoriented rigid-rod polymers.

A molecular composite requires that the rigid-rod polymer be effectively embedded in a flexible, possibly coil-like, matrix resin polymer. The flexible polymer serves to disperse the rigid-rod polymer, preventing bundling of the rigid-rod molecules. As in conventional fiber/resin composites, the flexible polymer in a molecular composite helps to distribute stress along the rigid-rod molecules via elastic deformation of the flexible polymer. Thus, the second, or matrix-resin, polymer must be sufficiently flexible to effectively surround the rigid-rod molecules while still being able to stretch upon stress. The flexible and rigid-rod polymers can also interact strongly via Van der Waals, hydrogen bonding, or ionic interactions. The advantages of molecular composites can only be realized with the use of rigid-rod polymers.

Most of the linear polymers produced commercially today are coil-like polymers. The chemical structure of the polymer chain allows conformational and rotational motion along the chain so that the entire chain can flex and adopt coil-like structures. This microscopic property relates directly to the macroscopic properties of flexural strength, flexural moduli, and stiffness. If fewer or less extensive conformational changes are possible, a stiffer polymer will result.

Two technical difficulties have limited molecular composites to laboratory curiosities. Firstly, the prior art on molecular composites calls for merely blending or mixing a rigid-rod polymer with a flexible polymer. It is well known in the art that, in general, polymers of differing types do not mix. That is, homogeneous blends cannot be obtained. This rule also applies to rigid-rod polymers and the early molecular composites which could be made with only small weight fractions of a rigid-rod component. Increasing the fraction of the rigid-rod component will lead to phase separation, at which point a molecular composite can no longer be obtained.

Secondly, rigid-rod polymers of significant molecular weight are exceedingly difficult to prepare. The technical problem is exemplified by polyparaphenylene. During the polymerization of benzene, or other monomer leading to polyparaphenylene, the growing polymer chain becomes decreasingly soluble and precipitates from solution causing the polymerization to cease. This occurs after the chain has grown to a length of only six to ten monomer units. These oligomers, i.e., rigid-rod polymers, are too short to contribute to the strength of a composite. The lack of solubility is a general property of rigid-rod polymers, hence, polymerization is difficult.

The solubility problem may be avoided in the special case in which the product polymer contains basic groups which can be protonated in strong acid and the polymerization can be conducted in strong acid. For example, polyquinoline can be prepared in the acidic solvent dicresolhydrogenphosphate, because the quinoline group interacts with the acidic solvent, preventing precipitation. The resulting polymers are soluble only in strong acids, making further processing difficult.

Before molecular composites can become a practical reality, the problems of (a) blending the rigid-rod and flexible components into a stable homogeneous phase, and (b) the low solubility of the polymer, must be overcome.

SUMMARY OF THE INVENTION

Rigid-rod polymers are polymers having a rigid-rod backbone formed from a plurality of monomer units joined together by covalent bonds, such as carbon-carbon and carbon-nitrogen covalent bonds. At least 95% of the covalent bonds bonding or connecting the monomer units will be parallel, that is, the longitudinal axis of all the covalent bonds between the monomer units will be substantially parallel, thus resulting in a polymer backbone that is linear and substantially straight. Preferably, at least about 99% of the covalent bonds between the monomer units will be substantially parallel.

The rigid-rod polymers of the present invention are unique in that they are soluble in one or more organic solvent(s). The polymer and the monomers demonstrate a significant degree of solubility in a common solvent system so that the polymer will remain in a dissolved state in the polymerization solvent system. The rigid-rod polymers of the present invention are made soluble by pendant solubilizing organic groups (side groups or side chains) which are attached to the backbone, that is, to the monomer units. The pendant organic groups are flexible groups, which impart increased solubility and meltability to the polymer. When the pendant organic groups have a relatively high molecular weight, for example, greater than about 300, they can act as the functional equivalent of the coil-like matrix component of a molecular composite. Therefore, such polymers can be considered to be self-reinforced plastics or single-component molecular composites. Conversely, when the rigid-rod polymer has relatively lower molecular weight organic groups appended, the rigid-rod polymer can be mixed with a coil-like matrix resin to form a molecular composite, wherein the pendant organic groups act as compatibilizers to inhibit phase separation. Thus, the rigid-rod polymers of the present invention have incorporated rod-like and coil-like components into a single molecular species.

Rigid-rod polymers produced in the past are, in general, highly insoluble (except in the special case of polymers with basic groups which may be dissolved in strong acid) and are infusible. These properties make them difficult, and often impossible, to prepare and process. We have found, surprisingly, that the incorporation of appropriate pendant organic side groups to the polymer substantially improves solubility and fusibility. Earlier work has suggested that such pendant side groups do not increase the solubility of rigid-rod polymers. However, by increasing the size of the side chain and/or by matching its properties (principally, polarity and dielectric constant) to the polymerization solvent, rigid-rod polymers of substantial molecular weight can be prepared. For example, when the polymerization is carried out in a polar solvent, such as dimethylformamide, the solubilizing organic side groups will preferably be polar and will have high dielectric constants, such as dielectric constants greater than 5.

Further, if the pendant side groups are relatively long and flexible and comprise a significant molecular weight fraction of the overall polymer, the rigid-rod backbone/flexible group chain polymer alone will behave as a molecular composite. The molecular-weight fraction of the side groups, i.e., solubilizing organic groups, to the whole polymer is from about 30% to about 95%, preferably from about 30% to about 60%, and most preferably from about 45% to about 55%. By "molecular-weight fraction" it is meant the percentage of the solubilizing organic groups' molecular weight to the total molecular weight of the rigid-rod polymer (i.e., molecular weight of monomer units and organic groups). Thus, for example, if the total weight of the polymer is 1,000,000, and the molecular weight total of the solubilizing organic groups is 500,000, the molecular-weight fraction of the solubilizing organic groups is 50% (500,000/1,000,000)×100.

Since the flexible organic side group component is chemically bound to the rigid component in the polymers provided in accordance with this invention, phase separation is inhibited. The rigid-rod backbone/flexible side-chain polymers of the present invention can be prepared in common solvents and can be processed with standard methods to give a stable, single-component, molecular composite useful for structural and other applications requiring high strength and modulus.

The rigid-rod polymers of the present invention, when used in a molecular composite or self-reinforced plastic, are the primary source of tensile strength and modulus. It is known in the literature that the properties of chopped fiber composites improve as the aspect ratio of the fiber increases from 1 to about 100, with less relative additional improvement on further increases of aspect ratio. It is also known in the literature that in simple blends of rigid-rod and flexible polymers, the strength and moduli of the molecular composite blend is a function of the aspect ratio of the rigid-rod component, and that these blends phase separate on heating (W. F. Hwang, D. R. Wiff, C. L. Benner, and T. E. Helminiak, *Journal of Macromolecular Science—Physics*, B22, pp. 231-257 (1983)). Preferably, when employed as a self-reinforcing plastic, the rigid-rod polymer of the present invention will have an aspect ratio of at least 100, that is, the backbone of the polymer will have straight segments with an average aspect ratio of at least 100 For structural and aerospace uses, for example, aspect ratios greater than 100 are desirable. For other less demanding uses, such as cabinets, housings, boat hulls, circuit boards and many others, the rigid-rod polymer can have an aspect ratio of 25 or more.

The high strength and stiffness of the soluble rigid-rod polymers of the present invention are directly related to the aspect ratio of the straight segments comprising the polymer chains. For the purposes of the present invention, by aspect ratio of a monomer unit is meant the length to diameter ratio of the smallest diameter cylinder which will enclose the monomer unit, including half the length of each connecting bond, but not including any solubilizing side group(s), such that the connecting bonds are parallel to the axis of the cylinder. For example, the aspect ratio of a polyphenylene monomer unit ($-C_6H_4-$) is about 1.

The aspect ratio of a polymer segment is taken to be the length to diameter ratio of the smallest diameter cylinder which will enclose the polymer segment, including half the length of the terminal connecting bonds, but not including any attached side groups, such that the axis of the cylinder is parallel to the connecting bonds in the straight segment.

For the purposes of the present invention, aspect ratio will only be applied to rigid-rod polymers, rigid-rod monomer units, or straight segments of rigid-rod polymers. The aspect ratio of a rigid-rod polymer will be taken to mean the average aspect ratio of its straight segments. The above definition of aspect ratio is intended to provide a close analogy to its common usage with respect to fiber-containing composites.

The polymer backbone of rigid-rod polymers provided in accordance with this invention will be substantially straight, with no flexibility that could result in bends or kinks in the backbone, that is, they will have a high aspect ratio. Accordingly, the polymers should be made employing processes which are not prone to the formation of occasional kinks or other imperfection interfering with the rigidity of the backbone. Nonetheless, almost all chemical reactions have side reactions, and, accordingly, some non-parallel covalent bonds between the monomer units will result during the formation. However, the rigid-rod polymers will have at least 95% parallel covalent bonds, and preferably, at least 99% parallel covalent bonds. Any non-parallel bonds between monomer units in the polymer chain will reduce the average length of straight segments. Thus, a polymer chain of length 1000 monomer units having 99% covalent bonds will contain, on average, 10 straight segments with average length 100. Rigid-rod polymers having greater than 99% parallel covalent bonds will be exceptionally stiff and strong and will be useful where high tensile and flexural strengths and moduli are required, as in aerospace applications. Rigid-rod polymers having between about 95% and 99% parallel covalent bonds will be useful for less stringent applications, such as body panels, molded parts, electronic substrates, and myriad others.

The polymers of the present invention comprise a rigid-rod backbone comprising at least about 25 monomer units, preferably at least about 100 monomer units, joined together by covalent bonds, non-limiting examples of which are carbon-carbon, carbon-nitrogen, carbon-oxygen, carbon-sulfur, nitrogen-nitrogen, silicon-oxygen or silicon-carbon covalent bonds, wherein at least about 95%, and preferably 99%, of the bonds are substantially parallel, the polymer and its monomers being soluble in a common solvent system. Solubilizing groups are attached to the rigid-rod backbone, that is, to some of the monomer units of the backbone. The polymer can be a copolymer of two or more monomers.

For the purposes of the present invention, the term "soluble" will mean that a solution can be prepared containing greater than 0.5% by weight of the polymer and greater than about 0.5% of the monomer(s) being used to form the polymer.

By "solubilizing groups" is meant functional groups which, when attached as side chains to the polymer in question, will render it soluble in an appropriate solvent system. It is understood that various factors must be considered in choosing a solubilizing group for a particular polymer and solvent, and that, all else being the same, a larger or higher molecular weight solubilizing group will induce a higher degree of solubility. Conversely, for smaller solubilizing groups, matching the properties of the solvent and solubilizing groups is more critical, and it may be necessary to have, in addition, other favorable interactions inherent in the structure of the polymer to aid in solubilization.

By the term "rigid-rod monomer unit" it is meant the basic, organic, structural units of the polymer rigid-rod backbone chain in which the covalent bonds connecting them to adjacent monomer units are parallel regardless of conformational changes within the rigid-rod monomer unit. Examples of rigid-rod monomer units include phenylene groups, aromatic groups, and/or heterocyclic groups, including any attached side chain, i.e., organic groups.

Typically, only two covalent bonds connect each monomer unit to the polymer chain. These bonds may be parallel and co-linear, as in the 1,4-naphthyl monomer unit. They may also be parallel but not co-linear, as in the 1,5-naphthyl monomer unit.

The term "monomer unit" will always be used in the present invention to mean "rigid-rod monomer unit." In the instances where a flexible or non-rigid-rod monomer unit is discussed, it will be indicated as a "non-rigid monomer unit." Most non-rigid monomer units cannot attain a conformation in which the bonds to the polymer chain are parallel, for example, the 1,3-phenylene group or the 4,4'-diphenylether group. However, some non-rigid monomer units will admit a conformation in which the bonds to the polymer chain are parallel, such as the phenylene amide type non-rigid monomer units of KEVLAR (TM DuPont) (polyamide of 1,4-phenylenediamine and terepthalic acid). Polymers comprised of such non-rigid monomer units are "pseudo-rigid" due to the possibility of bent or kinked conformations. Rigid-rod polymers are, in general, stiffer than pseudo-rigid polymers.

There may be more than one way to conceptually divide a given polymer into monomer units. It is common practice to take the monomer units to correspond as closely as possible to the monomer(s) from which the polymer was produced. It is most convenient for the purposes of the present invention to take as monomer units (where possible) those repeat segments which connect to adjacent repeat segments through two single bonds. For example, although the quinoline unit is not part of either of the two monomers used in polyquinoline synthesis, it is taken as part of the monomer unit so that the monomer unit will terminate in two single bonds.

By the term "monomers," for the purposes of the present invention, it is meant the immediate chemical precursors to the polymer. Because most of the polymerization reactions described herein are condensation polymerizations, a monomer will typically lose one or more functional group(s) with respect to the corresponding monomer unit. For example, the monomer dichlorobenzene ($C_6H_4Cl_2$) polymerizes to a polymer with phenylene ($C_6H_4$) monomer units.

A monomer may have an attached side chain which is itself a polymer. For the purpose of the present invention, such a monomer will be written as any other monomer with a side group; for example, 2-(polyorgano)-1,4-dichlorobenzene or 2-(poly-2,6-dimethylphenylene oxide)terepthalic acid. The corresponding monomer units would be 2-(polyorgano)-1,4-phenylene and 2-(poly-2,6-dimethylphenylene oxide)-1,4-phenylene. An alternate nomenclature would treat the monomers as end-capped polymers; for example, terephthalic acid-terminated poly-2,6-dimethylphenylene oxide. The latter nomenclature will not be used herein.

The solubility of rigid-rod polymers provided in accordance with this invention is achieved by the attachment of pendant, solubilizing organic groups to at least some of the monomer units of the polymers. One who is skilled in the art will recognize that it is difficult to determine a oriori what combinations of organic substituent (pendant organic group), polymer backbone, polymer configuration, solvent system, and other environmental factors (e.g., temperature, pressure) will lead to solubility due to the many complex interactions involved. Indeed, as is mentioned above, other workers have found that pendant organic side groups do not provide a substantial increase in the solubility of rigid-rod oligomers and polymers. We, however, have discovered general strategies for the rational design of soluble rigid-rod polymer systems. For example, if the rigid-rod polymers are to be synthesized in polar solvents, the pendant solubilizing organic groups of the polymer and the monomer starting material will be a group that is soluble in polar solvents. Similarly, if the rigid-rod polymers are to be synthesized in non-polar solvents, the pendant solubilizing organic group on the rigid-rod polymer and the monomer starting material will be a group that is soluble in non-polar solvents.

One can estimate the compatibility of a solvent and pendant organic substituent type by comparing properties, such as dielectric constant and dipole moments. There are also various types of semi-empirical sets of parameters for non-polymeric materials (such as Hildebrand's solubility parameters—J. H. Hildebrand and R. I. Scott, *The Solubility of Non-electrolytes*, 3rd Ed., Dover Publications, NY, 1964—and derivatives thereof) that can be used to estimate compatibility. Different sets of these solubility parameters have been developed to account for various types of solvent/solute interactions (e.g., dispersion interactions, induction, and dipole interactions), and higher solubility is achieved as more of these sets of parameters are matched. We have found that, other factors being equal, a relatively higher molecular weight pendant organic group will have a greater effect than a relatively lower molecular weight group on the solubility characteristics of the overall polymer. Therefore, it is generally preferred that the solubilizing organic groups be of moderately high molecular weight, that is, molecular weight of greater than about 300. Furthermore, when the molecular weight of the pendant organic groups is greater than about 300, they can act as the functional equivalent of the coil-like matrix of a molecular composite.

Various factors dependent on the nature of the backbone itself also affect the inherent solubility of the polymer. Polymers containing basic functionalities in the monomer units, e.g., polyquinolines, are generally soluble in acidic solvents. Rod-like heteroaromatic polymers can be solubilized by hydrogen bonding and ionic interactions. For instance, polyamides are often soluble in LiCl-containing polar aprotic solvents and strong acids. The orientation of the individual monomer units, especially with regard to the positioning of pendant organic substituents, has been shown to have an effect on the solubility properties of polymers. In particular, 2,2'-disubstituted biphenylene units incorporated into aromatic polyesters (H. G. Rogers et al, U.S. Pat. No. 4,433,132; Feb. 21, 1984), rod-like polyamides (H. G. Rogers et al, *Macromolecules* 1985, 18, 1058) and rigid polyimides (F. W. Harris et al, *High Performance Polymers* 1989, 1, 3) generally lead to enhanced solubility, presumably not due to the identity of the substituents themselves but to sterically enforced non-coplanarity of the biphenylene aromatic rings. Extended, planar chains and networks of conjugated aromatics exhibit good stacking and strong intermolecular interactions and are generally expected to exhibit high crystallinity and, thus, poor solubility. Random distribution of side chains in homopolymers and especially copolymers will enhance solubility by lowering the symmetry of the polymer chain, thereby decreasing crystallinity.

The rigid-rod polymers (homopolymers and copolymers) provided in accordance with the present invention will have at least one monomer unit for each 100 monomer units in the rigid-rod backbone substituted with a solubilizing organic group. The solubilizing organic groups which are substituted on, attached to, or pendant to the monomer units are organic molecules that have solubility in one or more organic solvent system(s). In order that relatively small organic groups, that is, those of a molecular weight of less than about 300, are capable of providing appropriate solubility, other favorable backbone interactions, as described above, may be required. For instance, at least one 2,2'-disubstituted biphenylene fragment would be required in the backbone for each 200 monomer units in a polyparaphenylene type polymer.

In embodiments of the invention, where the rigid-rod polymer is a homopolymer, the same organic or pendant group(s) occur(s) on each monomer unit. The side chains are chosen to enhance solubility, especially in the polymerization solvent system. For example, polar groups, such as N,N-dimethylamido groups, will enhance solubility in polar solvents. Less polar side groups, such as ethers, aryl and alkyl groups, are used in less polar solvents.

In one embodiment of the invention, the polymer is a copolymer of two or more monomer unit types, and the majority of monomer units are unsubstituted, and the remainder are substituted with solubilizing organic groups. The polymer can be formed from two different monomer units or monomers, three different monomer units or monomers, four different monomer units or monomers, and so on. At least one out of every 100 monomer units in the rigid-rod backbone has a solubilizing organic group attached to it. Preferably, more than one out of every 100 monomer units or monomers have solubilizing organic groups.

There does not appear to be a universally recognized nomenclature scheme for many of the monomeric units of the present invention. For example, 1,4-phenylene (see Formula IA) is sometimes named benzene-1,4-didehydro; 1,10-anthracenyl (see Formula XVA) is sometimes named 1,10-anthrylene; 2,6-quinoline (see Formula XA) is sometimes named 2,6-quinolinediyl; and 1,5-naphthylene (see Formula XIIIA) is sometimes named 1,5-naphthenylene. Accordingly, the monomeric units have been named in accordance with the nomenclature used in current literature.

DETAILED DESCRIPTION OF THE INVENTION

The soluble rigid-rod polymers of the present invention can be made from virtually any organic monomer or monomers that can bond via parallel covalent bonds. Preferably, the soluble rigid-rod polymers of the present invention comprise a rigid-rod backbone comprising one or more of the following monomer units: paraphenyl, parabiphenyl, paraterphenyl,2,6-quinoline, 2,6-quinazoline,paraphenylene-2-benzobisthiazole, paraphenylene-2-benzobisoxazole, paraphenylene-2-benzobisimidazole, paraphenylene-1-pyromellitimide, 2,6-naphthylene, 1,4-naphthylene, 1,5-naphthylene, 1,4-anthracenyl, 1,10-anthracenyl, 1,5-anthracenyl, 2,6-anthracenyl, 9,10-anthracenyl, and 2,5-pyridinyl. However, the rigid-rod polymers of the present invention can also be made from other monomer units, in addition to those named above. The polymer will be at least 25 monomer units in length, preferably at least 100 monomer units in length, and, most preferably, longer than 100 monomer units. The polymer can be a homopolymer of a single monomer or a copolymer of two or more different monomers or monomer units.

The rigid-rod polymers of the present invention are linear polymers with parallel covalent bonds between the monomer units. The rigid-rod polymers will have at least 95% parallel covalent bonds, and preferably at least 99% parallel covalent bonds, i.e., they will have high aspect ratios. The monomer units are not necessarily in a straight line. In some polymers, the majority of monomer units will be in a straight line (see chain A below). In other polymers, the monomer units will be staggered in a stair-like fashion (see chain B below) or in a crankshaft-like fashion (see chain C below). (The chain A, B and C monomer units are shown schematically without pendant organic side groups.) The monomer units can rotate about the linear axis of the covalent bonds between the monomers. However, the monomer units are restricted from flexing with respect to the bond, thus forming a rigid-rod polymer. Although the covalent bonds between the monomer units do not necessarily line up in a straight line, i.e., they may not be co-linear, the bonds are parallel to yield a substantially linear rigid-rod polymer.

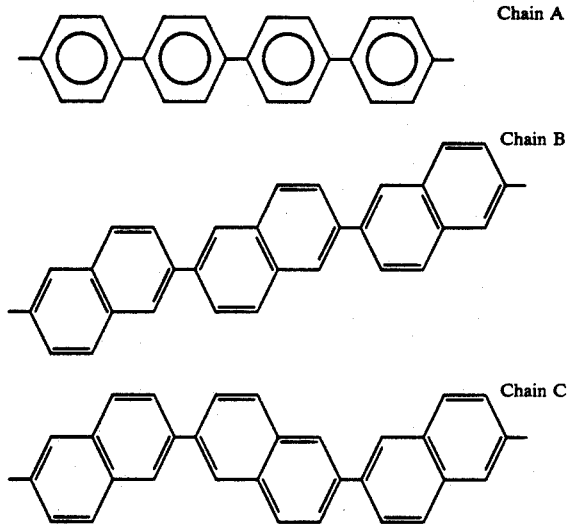

Chain A

Chain B

Chain C

Other polymer systems have been described in the past as rigid or rod-like but must not be confused with true rigid-rod polymers provided in accordance with this invention. For instance, long chain para-oriented aromatic polyamides and polyesters often exhibit ordering, due to various intermolecular forces, into rod-like assemblies and consequently demonstrate some of the advantages (e.g., high strength) and disadvantages (poor solubility) of true rigid-rod polymers. Such polymer systems are actually only "pseudo-rigid" because they are not connected entirely by parallel bonds and, thus, can have conformations with kinks in the polymer backbone, leading to poorer reinforcing properties.

The rigid-rod polymers of the present invention will have at least one monomer unit for each 100 monomer units in the rigid-rod backbone substituted with a solubilizing organic group. Preferably, the polymer will have more than one monomer unit per 100 monomer units substituted with solubilizing organic groups. The solubilizing organic groups which are substituted on, attached to, or pendant to, the monomer units are organic molecules that have solubility in one or more organic solvent system(s). Solubilizing organic groups which can be used include, but are not limited to, alkyl groups, aryl groups, aryl ketone groups alkaryl groups, aralkyl groups, alkyl or aryl amide groups, alkoxy groups, polyalkeneoxy groups, polyphenylene oxide groups, polyphenylene sulfide groups, polystyrene groups, polyvinyl chloride groups, polyalkylmethacrylate groups, polyacrylonitrile groups, polyalkylvinyl ether groups, polyvinyl alcohol groups, polyvinyl acetate groups, perfluoroalkyl groups, perfluoroalkoxy groups, polyester groups, polyimide groups, polyamide groups, polyfluoroalkyl groups, polyfluoroaryl groups, polyfluoroalkoxy groups, sulfonamide groups, aryl ester groups, aklyl ester groups, sulfonate ester groups, alkyl sulfone groups, aryl sulfone groups, alkyl ketone groups, aryl ketone groups, and poly(phenoxyphenyl ketone) groups. Other organic groups providing solubility in particular solvents can also be used as solubilizing organic groups.

In one embodiment of the present invention, the rigid-rod polymers will have at least one of the Group A monomer units of the Formulae IA, IIA, IIIA, IVA, VA, VIA, VIIA, VIIIA, IXA, XA, XIA, XIIA, XIIIA, XIVA, XVA, or XVIA below. In a second embodiment of the present invention, the rigid-rod polymers will be copolymers comprising: (1) at least two different members selected from the group consisting of the Group A monomer units; or (2) at least two different members selected from the group consisting of Group B monomer units of the Formulae IB, IIB, IIIB, IVB, VB, VIB, VIIB, VIIIB, IXB, XB, XIB, XIIB, XIIIB, XIVB, XVB, or XVIB below; or (3) at least one member selected from the group consisting of the Group A monomer units and at least one member selected from the group consisting of Group B monomer units, wherein one or more of the Group B monomer units can be unsubstituted; or (4) at least one member selected from the group consisting of the Group B monomer units wherein a portion of such Group B monomer units can be unsubstituted. In a third embodiment, the rigid-rod polymers of the present invention will incorporate at least one monomer unit selected from the group consisting of one of the Group B monomer units of the Formulae IB, IIB, IIIB, VIB, VIIB, VIIIB, IXB, XIIB, XIIIB, XIVB, XVB, or XVIB.

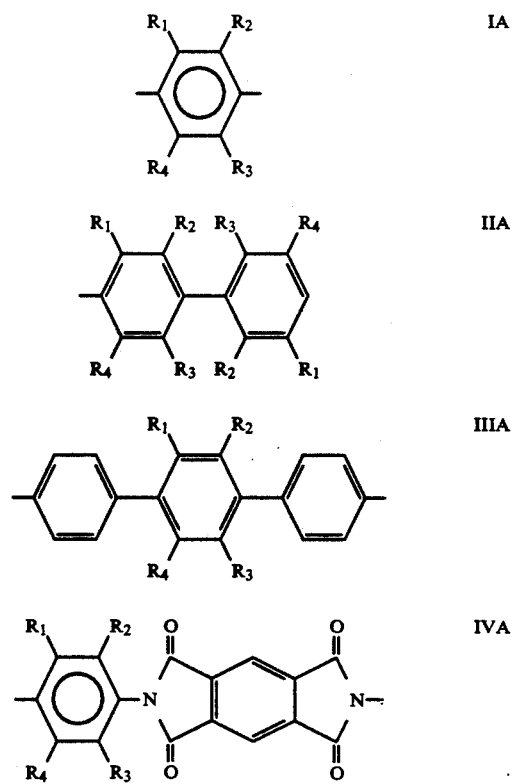

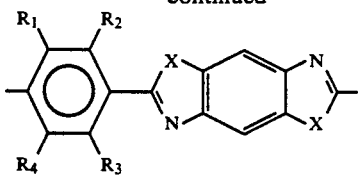
VA wherein

R₁, R₂, R₃, and R₄ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polystyrene, polyvinyl chloride, polyalkylmethacrylate, polyadrylonitrile, polyalkylvinyl ether, polyvinyl alcohol, polyvinyl acetate, perfluoroalkyl, perfluoroalkoxy, polyester, polyamide, polyimide, polyfluoroalkyl, polyfluoroaryl, polyfluoroalkoxy, sulfonamide, aryl ester, alkyl ester, sulfonate ester, alkyl sulfonate, aryl sulfone, alkyl ketone, aryl ketone, and poly(phenoxyphenyl ketone), provided that at least one of $R_1$, $R_2$, $R_3$, and $R_4$ is other than hydrogen, and provided that the molecular weight of at least one of $R_1$, $R_2$, $R_3$, and $R_4$ is at least 300; and X is NH, O, or S.

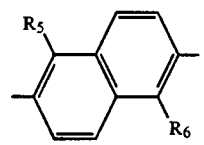
VIA

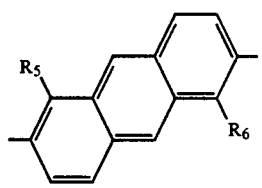
VIIA

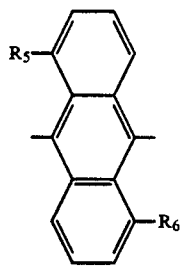
VIIIA

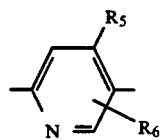
IXA

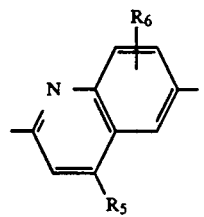
XA

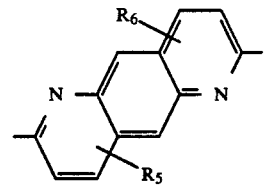
XIA

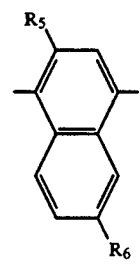
XIIA

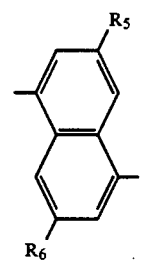
XIIIA

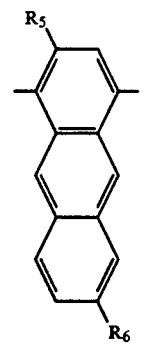
XIVA

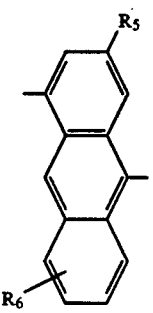
XVA

-continued

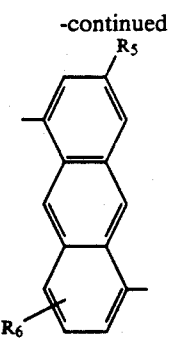
XVIA wherein $R_5$ and $R_6$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polystyrene, polyvinyl chloride, polyalkylmethacrylate, polyacrylonitrile, polyalkylvinyl ether, polyvinyl alcohol, polyvinyl acetate, perfluoroalkyl, perfluoroalkoxy, polypolyester, polyamide, polyimide, polyfluoroalkyl, polyfluoroaryl, polyfluoroalkoxy, sulfonamide, aryl ester, alkyl ester, sulfonate ester, alkyl sulfone, aryl sulfone, alkyl ketone, aryl ketone, and poly(phenoxyphenyl ketone), provided that at least one of $R_5$ and $R_6$ is other than hydrogen, and provided that the molecular weight of at least one of $R_5$ and $R_6$ is at least 300.

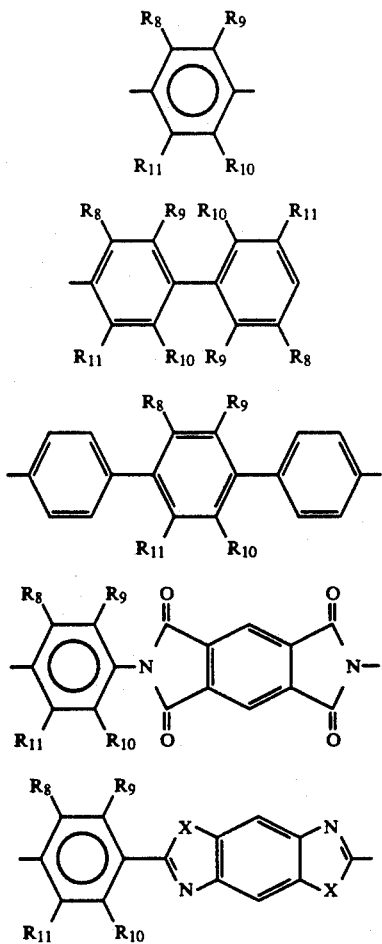

IB

IIB

IIIB

IVB

VB wherein $R_8$, $R_9$, $R_{10}$, and $R_{11}$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polystyrene, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester polyamide, polyimide, polyfluoroalkyl, polyfluoroaryl, polyfluoroalkoxy, sulfonamide, aryl ester, alkyl ester, sulfonate ester, alkyl sulfone, aryl sulfone, alkyl ketone, aryl ketone, and poly(phenoxyphenyl ketone), provided that the molecular weight of each of $R_8$, $R_9$, $R_{10}$, and $R_{11}$ is no greater than 300; and X is NH, O, or S.

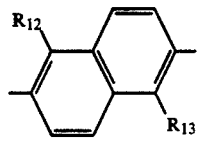
VIB

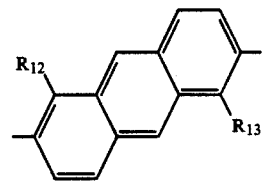
VIIB

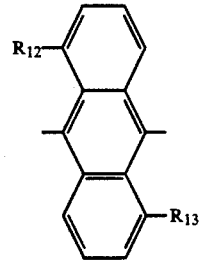
VIIIB

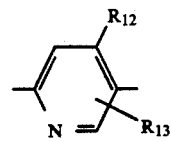
IXB

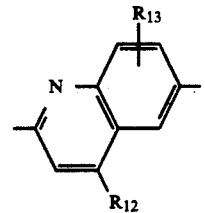
XB

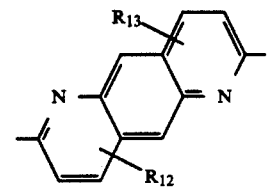
XIB

-continued

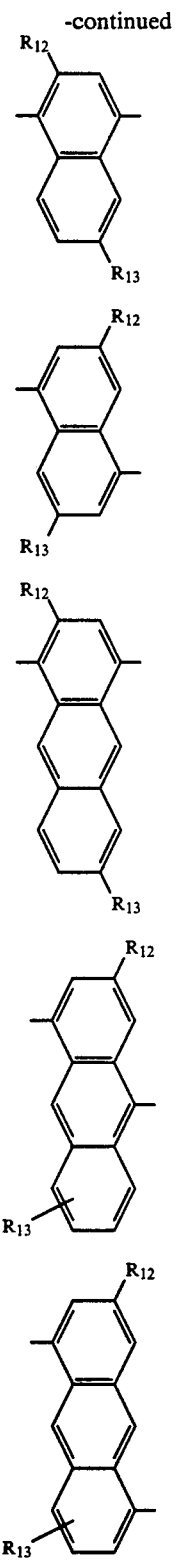

wherein $R_{12}$ and $R_{13}$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polystyrene, polyvinyl chloride, polyalkylmethacrylate, polyacrylonitrile, polyvinyl alcohol, polyvinyl acetate, perfluoroalkyl, perfluoroalkoxy, polyester, poly(phenoxyphenyl ketone), polyamide, and polyimide, polyfluoroalkyl, polyfluoroaryl, polyfluoroalkoxy, sulfonamide, aryl ester, alkyl ester, sulfonate ester, alkyl sulfone, aryl sulfone, alkyl ketone, and aryl ketone, provided that each of $R_{12}$ and $R_{13}$ has a molecular weight of less than 300.

The alkyl groups can have one or more carbon atoms and can be straight-chained or branch-chained alkyls or polycycloalkyls, such as $C_{22}$ alkyls (i.e., alkyls of at least 22 carbon atoms), $C_{72}$ alkyls, $C_{100}$ alkyls, $C_{163}$ alkyls, and the like. The aryl organic groups can be monoaryls or polyaryls, such as phenyl, naphthyl, anthracyl, polyphenylene, and polyanthracenylene. The alkaryls are aromatic groups substituted with one or more alkyl groups, preferably polyaryl substituted with alkyl groups, such as poly(methyl)phenylene, poly(dibutyl)naphthalene), poly(tri-tetracontylanthryl), poly(dioctyl)phenylene, poly(pentadecyl)naphthylene, poly(hentriacontyl)anthracenylene, and the like. Aralkyl organic groups are alkyl groups substituted with one or more aryl groups such as phenyloctyl, dinaphthyltriacontyl, and the like. Alkyl and aryl amide organic groups are alkyl groups (described above) or aryl groups (described above) connected to the monomer unit through an amide linkage. Alkoxy organic groups are alkyl groups (described above) connected to the monomer unit through an oxygen-ether linkage, such as hexadecyloxy.

Polyalkyleneoxy organic groups are homopolymers and copolymers of alkylene oxides, such as ethylene oxide, propylene oxide, butylene oxide, octadecylene oxide, and the like, joined to the monomer unit by an ether linkage. Polyphenylene oxide organic groups are polymers containing two or more phenylene groups joined to each other through an ether linkage, and the polymer, in turn, is attached to the monomer unit by an ether linkage. Polyphenylene sulfide is a polymer having two or more phenylene groups, each phenylene group being connected to adjacent phenylene groups by thioether linkage, and the polymer, in turn, is attached to the monomer unit by thioether linkage. The polyvinyl chloride organic group is a polymer containing two or more vinyl chloride monomer units. The polymer molecular weight can be from 124 to over several million.

The polyalkylmethacrylate organic group is a polymer of alkylmethacrylates, such as methylmethacrylate. These polymers can have molecular weights from about 200 up to several million. The polyacrylonitrile organic group is a polymer of two or more acrylonitrile monomers. These polymers have molecular weights from about 100 to several million. The polyvinyl alcohol organic group is a polymer having one or more vinyl alcohol monomer(s). This polymer can have molecular weights of from about 100 up to several million. The polyvinyl acetate organic group is a polymer formed from one or more vinyl acetate monomer(s) and can have a molecular weight of from about 150 to several million. Perfluoroalkyl organic groups are alkyl organic groups (described above) wherein all of the hydrogen atoms have been replaced by fluorine. The perfluoroalkoxy organic group is an alkoxy organic group (described above) wherein all of the hydrogen atoms have been substituted with fluorine atoms. The polyester groups are alkyl or aryl polymers having the monomer units connected by ester linkages; these groups can have a molecular weight of from about 100 to several million. The polyamide organic groups are alkyl or aryl polymers having the monomer units connected by amide linkages. The molecular weight of these groups can be from about 150 to several million. The polyimide organic groups are polymers having the monomer units connected by imide linkages and can have a molecular weight of from about 200 to several million. Poly(phenoxyphenyl ketone) organic groups are comprised of phenylene oxide and benzoyl units, as, for example polyetheretherketone (PEEK):

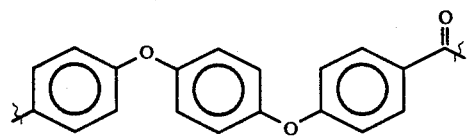

and polyetherketone (PEK):

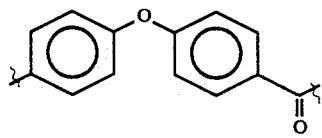

The poly-(phenoxyphenylketone) organic group is connected to the monomer unit of the rigid-rod backbone either by a carbonyl group or an ether linkage.

In embodiments of the present invention, which include organic solubilizing groups with a molecular weight greater than about 300, that is, rigid-rod polymers that can act as self-reinforcing molecular composites, the molecular-weight fraction of the solubilizing organic groups $R_1$ through $R_6$ of the polymer will be between about 30% and 95%, preferably between about 30% and about 60%, and most preferably between about 45% and about 55% of the whole polymer (backbone and organic groups).

Polymers of the present invention containing the monomer units of Formula IA, IIA, IIIA, VIA, VIIA, VIIIA, IXA, XA, XIA, XIIA, XIIIA, XIVA, XVA, or XVIA can be prepared from the corresponding dihalo monomer starting material of Formula IC, IIC, IIIC, VIC, VIIC, VIIIC, IXC, XC, XIC, XIIC, XIIIC, XIVC, XVC, or XVIC below, respectively, wherein $R_1$, $R_2$, $R_3$, $R_4$, $R_5$, and $R_6$ are as defined above, and W is Cl, Br, or I. Similarly, the polymers of the present invention that contain monomer units of Formula IB, IIB, IIIB, VIB, VIIB, VIIIB, IXB, XB, XIB, XIIB, XIIIB, XIVB, XVB, or XVIB can be prepared from the corresponding monomer starting material of Formula ID, IID, IIID, VID, VIID, VIIID, IXD, XD, XID, XIID, XIIID, XIVD, XVD, or XVID below, respectively, wherein $R_8$, $R_9$, $R_{10}$, $R_{11}$, $R_{12}$, and $R_{13}$ are as defined above, and W is Cl, Br, or I.

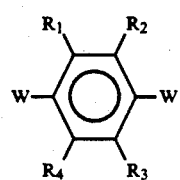 IC

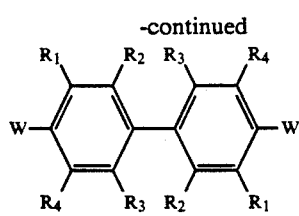 IIC

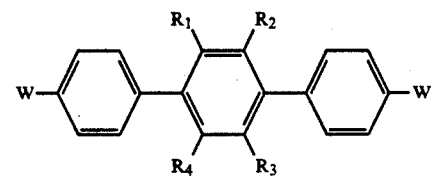 IIIC

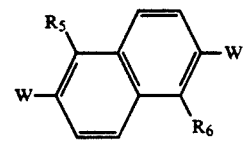 VIC

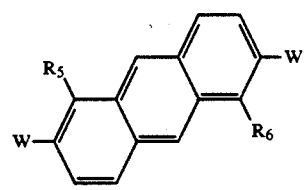 VIIC

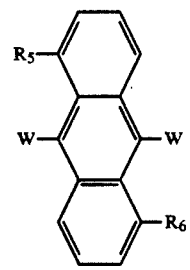 VIIIC

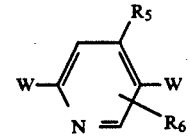 IXC

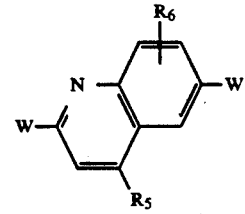 XC

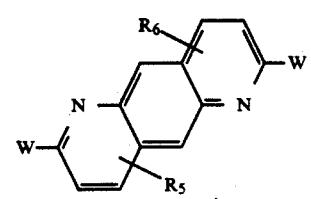 XIC

-continued
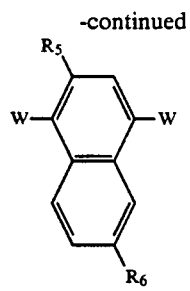 XIIC
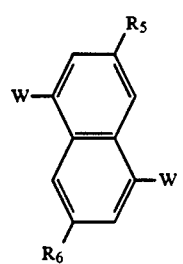 XIIIC
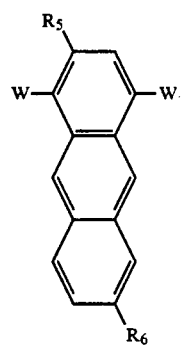 XIVC
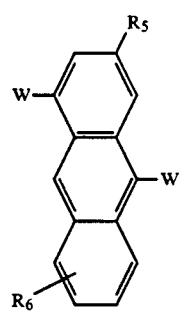 XVC
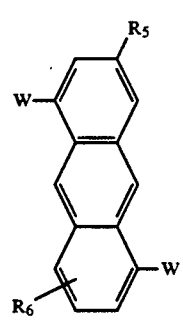 XVIC
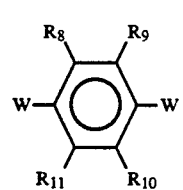 ID
-continued
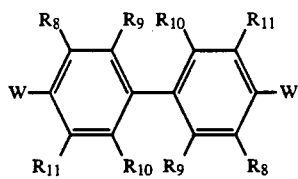 IID
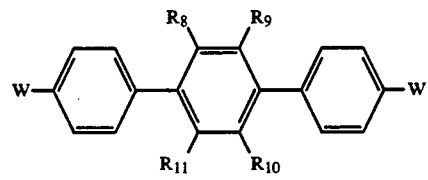 IIID
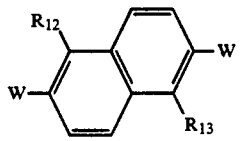 VID
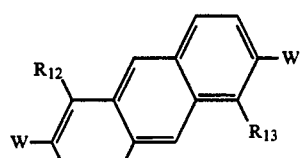 VIID
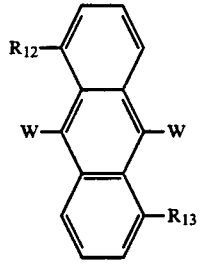 VIIID
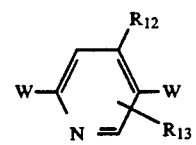 IXD
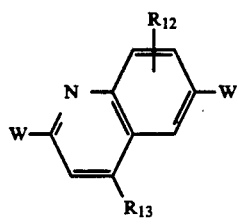 XD
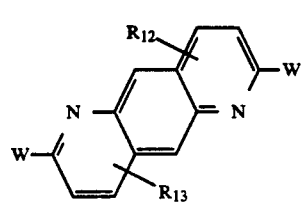 XID

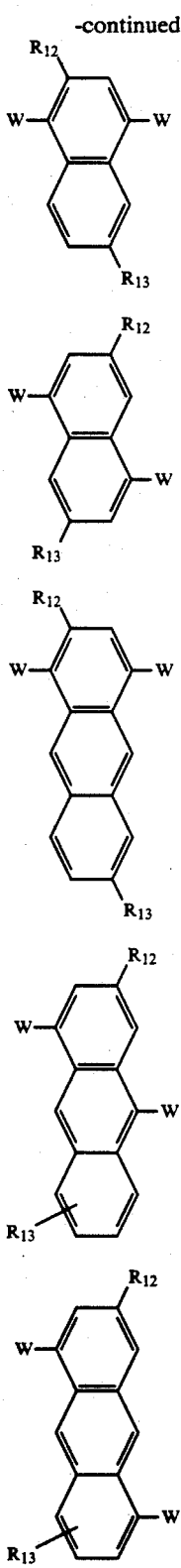

The first and third rings of the terphenyl monomer units or monomers of Formulae IIIA, IIIB, IIIC, and IIID are not substituted with organic groups. However, if desired, the first and third rings of the terphenyl monomer unit or monomer can be substituted with organic groups in the same manner as the second (middle) ring of the terphenyl monomer unit or monomer.

The monomer units of Formulae VIA, VIIA, VIIIA, IXA, XA, XIA, XIIA, XIIIA, XIVA, XVA, XVIA, VIB, VIIB, VIIIB, IXB, XB, XIB, XIIB, XIIIB, XIVB, XVB, and VIB, and the monomer of VIC, VIIC, VIIIC, IXC, XC, XIC, XIIC, XIIIC, XIVC, XVC, XVIC, VID, VIID, VIIID, IXD, XD, XID, XIID, XIIID, XIVD, XVD, or XVID are shown substituted with two organic groups ($R_5$ and $R_6$ or $R_{12}$ and $R_{13}$). However, these groups can be substituted with more than two organic groups, for example, the naphthyl group can be substituted with up to six groups (groups $R_5$ and $R_6$ or $R_{12}$ and $R_{13}$, the anthracenyl group can be substituted with up to eight groups, the pyridinyl group can be substituted with up to three groups, the quinolinyl groups can be substituted with up to five groups, and the diazaanthracenyl group can be substituted with up to six groups.

The polymers of the present invention having pyromellimide monomer units joined by aromatic monomer units, such as a phenyl monomer, a biphenyl monomer, a terphenyl monomer, a 2,6-naphthyl monomer, a 2,6-anthracenyl monomer, a 9,10-anthracenyl monomer, a 1,4-naphthyl monomer, a 1,5-naphthyl monomer, a 1,4-anthracenyl monomer, a 1,10-anthracenyl monomer, or a 1,5-anthracenyl monomer can be prepared from the reaction of the corresponding diamino monomers of Formulae IC, IIC, IIIC, VIC, VIIC, VIIIC, XIIC, XIIIC, XIVC, XVC, and XVIC, wherein W is amino and $R_1$, $R_2$, $R_3$, $R_4$, $R_5$, and $R_6$ are as defined above, and pyromellitic anhydride, in accordance with the condensation reaction described herein.

Copolymers containing the benzobisthiazole monomer units can be prepared from 2,5-diamino-1,4-benzenedithiazole and the monomers of Formulae IC, IIC, IIIC, VIC, VIIC, VIIIC, XIIC, XIIIC, XIVC, XVC, XVIC, ID, IID, IIID, VID, VIID, VIIID, XIID, XIIID, XIVD, XVD, and XVID, wherein W is COOH and $R_1$, $R_2$, $R_3$, $R_4$, $R_5$, $R_6$, $R_8$, $R_9$, $R_{10}$, $R_{11}$, $R_{12}$, and $R_{13}$ are as defined herein, by treating such monomers with 2,5-diamino-1,4-benzenedithiol in polyphosphoric acid at elevated temperatures as described herein.

Copolymers containing the benzobisoxazole monomer units can be prepared from 2,5-diamino-1,4-dihydroxybenzene and the monomers of Formulae IC, IIC, IIIC, VIC, VIIC, VIIIC, XIIC, XIIIC, XIVC, XVC, XVIC, ID, IID, IIID, VID, VIID, VIIID, XIID, XIIID, XIVD, XVD, and XVID, wherein W is COOH and $R_1$, $R_2$, $R_3$, $R_4$, $R_5$, $R_6$, $R_8$, $R_9$, $R_{10}$, $R_{11}$, $R_{12}$, and $R_{13}$ are as defined above, by treating the monomers with 2,5-diamino-1,4-dihydroxybenzene in polyphosphoric acid at elevated temperatures.

Copolymers containing the benzobisimidazole monomer units can be prepared from 1,2,4,5-tetraaminobenzene and the monomers of Formulae IC, IIC, IIIC, VIC, VIIC, VIIIC, XIIC, XIIIC, XIVC, XVC, XVIC, ID, IID, IIID, VID, VIID, VIIID, XIID, XIIID, XIVD, XVD, and XVID, wherein W is COOH and $R_1$, $R_2$, $R_3$, $R_4$, $R_5$, $R_6$, $R_8$, $R_9$, $R_{10}$, $R_{11}$, $R_{12}$, and $R_{13}$ are as defined above, by treating the monomers with 1,2,4,5-tetraaminobenzene in polyphosphoric acid at elevated temperatures as described herein.

The copolymers containing the monomer units benzobisthiazole, benzobisoxazole or benzobisimidazole (the monomer units of Formulae VA and VB, where X is S, O or NH, respectively) are shown with a phenyl comonomer unit. These polymers, however, can have other aryl monomer units, such as 4,4'-biphenyl, 4',4''-terphenyl, 2,6-naphthyl, 2,6-anthracenyl, 9,10-anthracenyl, 1,4-naphthylene, 1,5-naphthylene, 1,4-anthracenyl, 1,10-anthracenyl, and 1,5-anthracenyl monomers of Formulae IA, IIA, IIIA, VIA, VIIA, VIIIA, XIIA, XIIIA, XIVA, XVA, XVIA, IB, IIB, IIIB, VIB, VIIB, VIIIB, XIIB, XIIIB, XIVB, XVB, and XVIB.

Substituted quinoline monomers can be prepared by treating 1-acetyl-4-nitrobenzene with an organic cyanide, such as phenylacetonitrile, phenoxyphenylacetonitrile, polyphenyleneoxide acetonitrile (acetonitrile-terminated polyphenylene oxide), to produce the corresponding isoxazole, which is reduced to the corresponding 2-organocarbonyl-4-acetyl-aniline, which is polymerized to produce the corresponding poly-2,6-(4-organoquinolines). Polyquinolines can also be produced by polymerizing a 4,4'-diamino-3,3,diorganocarbonyl biphenyl and a 4,4'-organoacetyl biphenyl to form poly(4,4'-biphenyl-4-organo-2,6-quinoline-4-organo-6,2-quinoline) rigid-rod polymers. The biphenyl groups can also be substituted with organic groups. For example, a 4,4'-diamino-3,3'-diorganocarbonyl biphenyl can be polymerized with a 3,3'-diorgano-4,4'-diacetyl biphenyl to yield a poly(3,3'-diorgano-4,4'-biphenyl,4-organo-2,6-quinoline-4-organo-6,2-quinoline).

The rigid-rod polymers of the present invention are made in accordance with well-known chemical polymerization and addition reactions or by novel processes described herein. Such processes for preparation of the rigid-rod polymers of the present invention employ chemical polymerization addition reactions in solvent systems in which the rigid-rod polymers and the monomer starting materials are both soluble. Of course, the monomer and polymer will not demonstrate complete solubility under all conditions. The polymer will likely demonstrate solubility only up to a certain weight fraction, depending on the exact solvent-polymer pair and other factors, such as temperature. Obviously, it is not necessary for the monomer to be completely soluble in a solvent for a chemical reaction to proceed. As is well known in the art, compounds demonstrating limited solubility in a chemical mixture will completely react to give product due to the equilibrium between dissolved and undissolved monomer, that is, undissolved monomer will slowly undergo dissolution as that fraction of dissolved monomer is continuously exhausted in the reaction. As is discussed above, the monomer and polymer are considered "soluble" in a particular solvent system when a solution can be prepared which contains at least about 0.5% by weight monomer and at least about 0.5% by weight polymer.

In order to assure solubility of the monomer and polymer in the solvent, the properties of the appended organic groups must be matched to those of the desired solvent. Thus, if the rigid-rod polymers are to be synthesized in polar solvents, the pendant solubilizing organic groups of the polymer and the monomer starting material will be a group that is soluble in polar solvents. Similarly, if the rigid-rod polymers are to be synthesized in non-polar solvents, the pendant solubilizing organic group on the rigid-rod polymer and the monomer starting material will be a group that is soluble in non-polar solvents. We have found that it is very important to match the dielectric constant and dipole moment of the solubilizing organic groups to that of the solvent to achieve solubilization. For instance, to achieve solubility in polar aprotic solvents such as NMP, the solubilizing organic groups should have dielectric constants greater than about 5 and dipole moments greater than about 1.5. In general, relatively long organic side chains, e.g. those with a molecular weight of greater than about 300, are preferred to enhance solubility of the rigid-rod polymers of the present invention.

Surprisingly, however, we have found that rigid-rod polyphenylene type polymers, that is, rigid-rod polymers comprised of linear polyparaphenylene type monomer units of type IA, IIA, IIIA, VIIIA, IXA, XIIA, XIVA, IB, IIB, IIIB, VIIIB, IXB, XIIB, or XIVB, and crankshaft type polyphenylene type monomer units of type VIA, VIIA, XIIIA, XVA, XVIA, VIB, VIIB, XIIIB, XVB, or XVIB, can be solubilized with relatively short organic groups appended, e.g., organic groups with molecular weights from about 15 to about 300. Solubility is typically achieved by a combination of favorable interactions acting together. For instance, solubility can be achieved in rigid-rod polyparaphenylenes substituted with the very small (i.e., low molecular weight) but very polar side chains hydroxy (—OH) and amino (—NH$_2$). Heteroaromatic polyparaphenylene type polymers, such as those with monomer units IXA or IXB and poly(5,8-quinolines), naturally exhibit enhanced solubility in acidic solvents due to the basic nature of the heteroaromatic backbone. Planar aromatics tend to stack well, causing them to be very crystalline and, thus, have low solubility. This tendency to stack can be reduced by forcing adjacent aromatic rings, e.g., monomer units, to twist away from planarity. This can be effected by the addition of substituents next to the covalent bonds linking the monomer units, leading to significant numbers of disubstituted 2,2'-biaryl type linkages. Such units have been shown to increase solubility when incorporated into other types of polymer systems. Therefore, to achieve maximum solubility of short chain appended polyparaphenylenes, either the nature of the monomer units or of the polymerization should be such that significant numbers of 2,2'-biphenyl linkages are introduced into the polymer.

Processes for preparing unsubstituted or alkyl substituted polyphenylenes from aryl Grignard reagents are described in T. Yamamoto et al, *Bull. Chem. Soc. Jpn.*, 1978, 51, 2091 and M. Rehahn et al, Polymer, 1989, 30, 1054. Paraphenylene polymers (made up of monomer units of Formula IA or IB) can be prepared by the coupling of Grignard reagents with paraphenyl dihalides catalyzed by transition metal complexes. Thus, a mixture of 4-bromo-phenylmagnesium bromide (1 mole) and 4-bromo-3-alkyl-phenylmagnesium bromide (0.01 mole), the alkyl group having an average chain length of about 24 carbon atoms, will react in an ether solvent in the presence of a transition metal complex to yield a polyparaphenylene rigid-rod polymer having about one monomer unit per 100 monomer units substituted with a long-chain alkyl group. The transition metal-catalyzed coupling reaction proceeds selectively and quantitatively under mild conditions. In another variant of the reaction, 1,4-dibromobenzene (1.0 mole) and a 1,4-dibromobenzene substituted with a long-chain alkoxy group (0.1 mole) can be coupled in the presence of magnesium metal and a transition metal catalyst in an inert solvent, such as ether, to produce a polyparaphenylene rigid-rod polymer having on the average about one monomer unit out of 10 monomer units substituted with a long-chain alkoxy group. A variety of dihalogenated benzenes (monomers of Formula IC), biphenyls (monomers of Formulae IIC and IID), terphenyls (monomers of Formulae IIIC and IIID), anthracenes (monomers of Formulae VIIC, VIIIC, VIID, and VIIID), pyridines (monomers of Formulae XIC and IXD), naphthalenes (monomers of Formulae VIC and VID), quinolines (monomers of Formulae XC and XD), and 1,5-diazoanthracenes (monomers of Formulae XIC and XID) can be polymerized using these methods. The net reaction resembles the dehalogenation polymerization of dihaloaromatic compounds with copper and sodium. Dibromosubstituted compounds are the compounds of choice for the reaction; however, in many instances, the dichloro compound can also be used, if the reaction can be initiated. We have found that the NiCl$_2$ (2,2'-bipyridine) transition metal catalyst works satisfactorily for this reaction.

Coupling of the paradihaloarene monomers is preferably carried out with nickel or palladium catalysts with zinc as the reducing agent. We have discovered that such polymerizations give soluble rigid-rod polyparaphenylene polymers with high molecular weights in virtually quantitative yields. This approach has distinct advantages, since a wider variety of solvents can be employed, such as N,N-dimethylformamide (DMF), N-methylpyrrolidinone (NMP), hexamethylphosphoric triamide (HMPA), and benzene. This coupling reaction can also be used with monomers having specially reactive groups, such as nitrile and carbonyl groups. In addition, zinc is less expensive and easier to handle than magnesium. Similar reactions to prepare biphenyl derivatives and non-rigid polymer systems have been demonstrated by Colon (I. Colon and D. Kelsey, *J. Org. Chem.*, 1986, 51, 2627; I. Colon and C. N. Merriam, U.S. Pat. No. 4,486,576, Dec. 4, 1984). Unfortunately, this technique was demonstrated to be unsatisfactory to produce high molecular weight polymers from substituted dihalobenzene type monomers due to deactivation of the nickel catalyst by the substituents.

It was therefore unexpected when we discovered that certain mixtures of anhydrous nickel compounds, triarylphosphine ligands, inorganic salt promoters, and zinc metal was efficient for the preparation of high molecular weight polyparaphenylenes from the reductive coupling of paradihalobenzene monomer units substituted with solubilizing organic groups in anhydrous polar aprotic solvents. It is highly recommended to utilize highly purified (preferably greater than about 99% pure) paradihalobenzene monomer from which any water or other aprotic impurities have been removed. For instance, a mixture of one equivalent of anhydrous nickel chloride, three equivalents of sodium iodide, seven equivalents of triphenyl phosphine, and 50 equivalents of zinc metal is effective in the polymerization of about 30 equivalents of substituted paradichlorobenzene monomer. The polymerization reaction is preferably carried out at about 50° C. but is effective from about 25° C. to about 100° C. The ratio of equivalents of monomer to equivalents of nickel catalyst can vary over the range from about 10 to about 5000, and the ratio of equivalents of zinc to equivalents of monomer is at least 1.0. The ratio of equivalents of phosphine ligands and inorganic salt promoter to equivalents of nickel catalyst varies from about 1.0 to about 10 or more.

Aryl group coupling to afford polyphenylenes has also been effected by the palladium catalyzed condensation of haloaryl boronic acids as reported by Y. H. Kim et al, *Polymer Preprints*, 1988, 29, 310 and M. Rehahn et al, *Polymer*, 1989, 30, 1060. The para-haloaryl boronic acid monomers required for formation of polyparaphenylenes can be prepared by the monolithiation of the paradihalobenzene with butyl lithium at low temperature and subsequent trimethylborate quench and aqueous acid workup. These polymerizations are carried out in aromatic and ethereal solvents in the presence of a base such as sodium carbonate. Therefore, this type of reaction is suitable for producing polyparaphenylenes substituted with organic groups such as alkyl, aryl, aralkyl, alkaryl, polyfluoroalkyl, alkoxy, polyfluoroalkoxy, and the like.

Processes for preparing poly-p-phenylenebenzobisoxazole are described in J. F. Wolfe and F. E. Arnold, *Macromolecules*, 14, 909 (1981) and U.S. Pat. No. 4,229,556. Processes for preparing poly-p-phenylenebenzobisthiazole are described in J. F. Wolfe and B. H. Loo, *Macromolecules*, 14, 915 (1981) and U.S. Pat. No. 4,229,556. Processes for preparing poly-p-phenylenebisimidazole are described in U.S. Pat. No. 4,229,556. Processes for preparing polyquinolines are described in J. K. Stille, U.S. Pat. No. 4,000,187. The above-mentioned articles and U.S. Pat. No. 4,000,187 are incorporated hereby by reference.

The polyimide-type rigid-rod copolymers (made up of monomer units of Formulae IVA and IVB) can be prepared by condensing anhydrides with amines or isocyanates, preferably condensing dianhydride monomers with diamine monomers or diisocyanate monomers. For example, polyphenylenemellitimides can be prepared from paraphenylenediamine, which can be substituted at the 2, 3, 5, and/or 6 positions. Linear, rigid-rod polyimides can be formed by condensing pyromellitic dianhydride (PMDA) with aryl diamines, i.e., p-diaminobenzene. For example, the PMDA can be condensed with 2,6-anthracene diamines. The resulting polyimide will be a rigid-rod polymer capable of twisting and will contain a "crankshaft-type" arrangement in the backbone. (See chain C. Likewise, benzidine derivatives (4,4'-diaminobiphenyl) which have extended phenoxyphenyl and phenoxybiphenyl appendages can be used.

Although the polyimide-type rigid-rod copolymers have been illustrated with the monomer units of Formulae IVA and IVB, the polymers can have other aryl monomer units with the pyromellitimide monomer unit, wherein the aryl monomer units are the 4,4'-biphenyl, 4,4"-terphenyl, 2,6-naphthyl, 2,6-anthracenyl, 9,10-anthracenyl, 1,4-naphthylene, 1,5-naphthylene, 1,4-anthracenyl, 1,10-anthracenyl, and 1,5-anthracenyl monomer units of Formulae IA, IIA, IIIA, VIA, VIIA, VIIIA, XIIA, XIIIA, XIVA, XVA, XVIA, IB, IIB, IIIB, VIB, VIIB, VIIIB, XIIB, XIIIB, XIVB, XVB, and XVIB.

High-molecular-weight polyimides (the rigid-rod-polymers having the monomer units of Formulae IVA and IVB) can be obtained by executing the condensation reaction in two stages. In the first stage, the initial reaction forms a polyamic acid which can be obtained in high molecular weight. In the second stage, the reaction is carried out at a higher temperature, with or without a solvent, to cause a dehydrocyclization to form the polyimide. Flexible polymers, such as the polyisoimide, are much more soluble than rigid-rod polymers, and, thus, the polyisoimide prepolymer can be prepared in the solvent system which is favorable to the condensation reaction and yet not a good solvent for the rigid-rod polyimide. After preparation of the prepolymer, the prepolymer can be isolated and redissolved into a second solvent system in which the polyimide will be soluble. Conversion of the polyamic acid to the fully imidized polymer yields a linear, kink-free, rigid-rod polymer. Dehydrating agents may be employed to promote cyclization of the polyamic acid intermediate. Most chemical dehydrating agents, such as aliphatic acid anhydrides, ketones, and phosphorus trichloride, affect the formation of cyclized polyimide. Certain reagents, including trifluoroacetic anhydride and N,N'-dicyclohexylcarbodiimide, promote the conversion of the polyamic acid to the corresponding isoimide polymer, which usually can be thermally converted to the cyclic polyimide. The solubility of the growing polymer enhanced by the side-chain appendages (i.e., organic groups) will contribute to the formation of polyimides with high molecular weights. When both the polyimides and the precursor polyamic acids are soluble in a given medium, such as in an amide solvent (for example, N,N-dimethylacetamide and N-methylpyrrolidinone), polyimidization can be carried out in two stages at different reaction temperatures. When it is found that the fully imidized polymers have greater solubility in a different solvent than the precursor polyamic acids, it may be advantageous to isolate the polyamic acids and carry out the imidization in a second solvent. Alternatively, the polyamic acids can be prepared in a solvent, precipitated out, and the resulting solid polyamic acid can be fully imidized by heating. Diisocyanates can be used in place of diamines. Isocyanates react with pyromellitic dianhydride to give seven-membered cyclic intermediates which spontaneously collapse to yield a polyimide. The isocyanate monomers may be more difficult to prepare than the corresponding diamines.

Preferably, when the preparation of rigid-rod polymers is carried out by anodic polymerization, the monomer should be free of the following organic side groups: polyalkylmethacrylate, polyvinyl alcohol, polyvinyl acetate, and polyimide. When the rigid-rod polymers are prepared under Grignard conditions, the following types of organic groups may react with the Grignard reagents, causing undesirable side reactions: alkoxy, aryloxy, polyalkeneoxy, polyphenylene oxide, polyphenylene sulfide, perfluoroalkoxy, and phenoxyphenylperfluoroisopropylidene. Rigid-rodpolymers prepared under Grignard conditions preferably do not contain the following pendant organic side groups which are not compatible with Grignard conditions: polyalkylmethacrylate, polyvinyl alcohol, polyvinyl acetate, and polyvinyl chloride. Rigid-rod polymers with such side chains can be prepared with the process described above. If the nickel catalyzed process is used, the side chains of the monomers are preferably free of acidic protons, such as polyvinyl alcohol. The polyvinyl alcohol side chain can be prepared from the corresponding polyvinyl acetate side chain by hydrolysis of the latter.

The choice of solvents for the various polymerization or condensation reactions will be somewhat dependent on the reaction type and the type of solubilizing organic groups appended to the monomers. For the condensation of aryl monomers employing Grignard reagents with transition metal catalysts, the solvents of choice are ethers, and the best solubilizing side chains are polyethers, such as polyethylene oxide, and long-chain alkyls. Anodic polymerization is done in acetonitrile-type solvents, and the aromatic side chains, such as polyphenylene and polystyrene, would be the favored side chains. Cathodic polymerizations can be done in dimethylformamide and N-methylpyrrolidinone. More polar side chains, such as polyacrylates and polyvinyl alcohols, would be advantageous in such solvent systems.

The monomer units are known or can be prepared by conventional chemical reactions from known starting materials. For example, the paradihalobenzene monomers substituted at the 2 position with an alkoxy group can be prepared from the corresponding 2,5-dihalophenol by allowing the phenol in the presence of sodium hydroxide and benzyltriethylammonium chloride to react with the corresponding 1-haloalkyl, such as 1-bromohexadecane.

Para-dibromo-terphenyl monomers, di-substituted with aryl or aryloxide groups on the middle phenyl group, can be prepared from the corresponding diphenyl, phenoxyphenyl, or polyphenoxyphenyl diketones. For example, a double Friedel-Crafts acylation of oxalyl chloride with diphenyl ether yields 4,4'-diphenoxybenzil. Treatment of this diketone with 1,3-di(para-bromophenyl)-2-propanone forms 2,5-di(para-bromophenyl)-3,4-diphenoxyphenyl tetracyclone. Finally, tetracyclone is treated with norbornadiene to give 4,4''-dibromo-2',3'-di(para-phenoxyphenyl)para-terphenyl. Alternatively, the final reaction can be carried out in the presence of acetylenes to include 5' and/or 6' substitutions on the terphenyls.

The para-dihalobenzenes substituted with oligomeric phenyleneoxide-solubilizing organic groups can be prepared by the reduction of the corresponding substituted paranitroanilines nitroanilines to diamines. The substituents can be alkoxides, phenoxides, and the like. Diazotization of the paradiamines followed by bromination (copper bromide; Sandmeyer reaction) yields the corresponding substituted paradibromobenzenes. The corresponding Grignard reagents can then be utilized in the nickel-catalyzed polymerization discussed above to give substituted polyphenylenes.

Alternatively, alkoxy- and phenoxy-substituted dihalobenzenes can be prepared by treating bromoterephthalic acid or the corresponding dibromo compound with alkoxides or phenoxides to form the corresponding alkoxide- or phenoxide-substituted teraphthalic acids. The halodecarboxylation by the modified Hunsdieker reaction using mercuric oxide, bromine and visible light, yields the corresponding substituted dibromobenzenes. In the past, these copper-catalyzed ether-forming reactions were executed under rather forcing conditions. However, several variations to the Ullmann ether condensation have been developed which tolerate many functional groups and do not require activating (electron-withdrawing) groups in the electrophilic substrate and proceed under relatively mild reaction conditions.

Polyalkylene oxide or polyphenylene oxide substituents can be added to aryl groups, including phenyl groups, etc., by a diazonium route. For example, a benzene monomer can be prepared from a paradichlorobenzene which is nitrated to yield the corresponding 2-nitro-1,4-dichlorobenzene, reducing the nitrate group to an amine group, and diazotization of the amine groups to yield corresponding p-dichlorobenzenediazonium salt. The diazonium salt is treated with alkoxy alcohols, such as ethoxyethanol (Cello-solve TM ), 2-(2-ethoxy-ethoxy)ethanol, 2-methoxyethanol, 2-(2-methoxyethoxy)ethanol, and the like, to form the corresponding polyalkaleneoxy-substituted dichlorobenzenes. The diazonium salt is treated with aryl alcohols, such as phenol, phenoxyphenol, poly(phenoxy)- phenol, and the like, to form the corresponding polyphenyleneoxy-substituted dichlorobenzenes.

The substituted aryl paradiamines are prepared by a variety of routes. For example, alkoxy-, polyalkaleneoxy-, and polyphenylene oxide-substituted benzenediamines can be prepared from 2-bromo-4-nitroaniline by forming the corresponding trifluoroacetamide, then treatment with alkoxides or phenoxides. The nitrate group is reduced to form the corresponding substituted benzenediamine. Alternatively, 2-hydroxy-4-nitroaniline can be treated with polyalkyleneoxyalkyl iodide or polyphenyleneoxidephenyl iodide to yield the corresponding alkoxy-, polyalkyleneoxy-, or polyphenylene oxide-substituted nitroaniline. The nitroaniline product is reduced to yield the corresponding substituted benzene diamine. The coupling of phenols and alcohols in the presence of dicyclohexylcarbodiimide is another method of forming arylalkyl ethers under mild conditions.

Benzene groups can be substituted with poly(phenoxyphenylketone) organic solubilizing groups by treating 2-hydroxyterephthalic acid with 4-fluoro-4'-hydroxybenzophenone.

Terephthalic acid can be appended with a poly(2,6-dimethylphenylene oxide) side chain by treating 2-nitro-terephthalic acid diethyl ester with the monohydroxy-terminated polyphenylene oxide in dimethylsulfoxide in the presence of base, followed by hydrolysis of the ester groups, to yield 2-poly(2,6-dimethylphenylene oxide)terephthalic acid. Polyphenylene oxide is typically prepared by polymerization of 2,6-dimethylphenol in the presence of copper and oxygen in a pyridine solvent system. The growing polymer chain always has a phenolic group on one end only, thus only one end will react with the 2-nitroterephthalic acid diethyl ester. Other organic groups can be added to the benzene ring by using the corresponding phenol starting material. For example, nonylphenol can be used to prepare nonylphenoxyterephthalic acid monomer.

Oligoisoprenyl groups can be added to aryl groups by forming an acetyl derivative of a dibromo aryl starting material, such as the 2-acetyl derivative of paradibromobenzene. The acetyl derivative is then treated with oligoisoprenyllithium, which is prepared from isoprene and t-butyllithium.

Poly-epsilon-caprolactam solubilizing groups can be added to aryl groups by preparing a dinitro aryl derivative, converting that to a butyl-substituted dinitro aryl group, oxidizing the butyl group to a carboxylic acid group, and forming the corresponding acid chloride thereof. The acid chloride is treated with poly-epsilon-caprolactam (straight chain, prepared from epsilon-caprolactam) to yield the desired poly-epsilon-caprolactam-substituted dinitro aryl compound. The resulting monomer is reduced to yield the corresponding diamino monomer, which can be used to form rigid-rod polyimide polymers.

The other solubilizing organic groups, such as the polyphenylene sulfide groups, the polyvinyl groups, the polyalkylmethacrylate groups, the polyacrylonitrile groups, the polyvinyl alcohol groups, and the polyvinyl acetate groups, can be added to the monomer units described herein by conventional chemical means, such as anionic polymerization methods. (See "Anionic Polymerization," James E. McGrath, Ed., ACS Symposium Series 166, American Chemical Society, 1981.)

EXAMPLE I

Tetramethyldisilethylene Adduct of 2,5-Dibromoaniline

To a solution of 6.27 (0.025 mole) 2,5-dibromoaniline in 40 ml dry tetrahydrofuran at −78° C. are added 30.3 ml of 2.5M (0.053 mole) of a cooled hexane solution of n-butyl lithium under argon. A solution of 5.55 g (0.025 mole) of 1,2-bis(chlorodimethylsilyl)ethane in 40 ml tetrahydrofuran is slowly added to the mixture. The final mixture is allowed to warm to room temperature and then poured into water. The solution is diluted with ether, and the organic layer is separated. After washing the aqueous layer with additional portions of ether, the combined ethereal extracts are dried and condensed. The product is purified by crystallization.

Poly-(2,5-aniline)

To a solution containing 0.61 g 0.025 mole) activated magnesium metal in 30 ml tetrahydrofuran are added 9.83 g 0.025 mole) of the tetramethyldisilethylene adduct of 2,5-dibromoaniline under argon. After stirring the mixture at room temperature for one hour, 0.050 g 0.00018 mole) NiCl₂ bpy (2,2'-bipyridine) is added to the solution. The final mixture is heated and allowed to reflux for 24 hours before being poured into 250 ml ethanol. The precipitate that forms is collected by centrifugation using water as a wash. The solid material is then allowed to reflux in a dilute hydrochloric acid/ethanol solution. The final polymer precipitate is collected by filtration and dried in a vacuum to yield poly-(2,5-aniline).

EXAMPLE II 2,5-Dichlorophenyl Dimethyloctylsilyl Ether

To a solution of 3.75 g (0.023 mole) 2,5-dichlorophenol in 30 ml N,N-dimethylformamide are added 5.58 g (0.082 mole) imidazole and 16.6 ml (0.070 mole) chlorodimethyloctyl silane under argon. After stirring at room temperature for two hours, the mixture is diluted with an aqueous saturated sodium chloride solution and extracted with ether. The combined organic extracts are dried and condensed. The product is purified by column chromatography.

Poly-(2,5-phenol)

To a solution containing 0.61 g (0.025 mole) activated magnesium metal in 30 ml dry tetrahydrofuran are added 8.33 g 0.025 mole) 2, -dichlorophenyl(dimethyloctyl)silyl ether under argon. After stirring at room temperature for one hour, 0.050 g (0.00018 mole) NiCl₂ bpy is added to the solution. The final mixture is heated and allowed to reflux for 24 hours before being poured into 250 ml ethanol. The precipitate that forms is collected by centrifugation using water as a wash. The solids are then stirred with a dilute hydrofluoric acid solution in aqueous acetonitrile for 48 hours. The final precipitate is collected by filtration and dried in a vacuum to yield poly-(2,5-phenol).

EXAMPLE III 1,4-Dibromo-2-(oligo-alpha-methylstyrene)-benzene

A solution of 3.3 g dibromobenzylbromide (0.01 mole) dissolved in 500 ml methylene chloride/methylcyclohexane is cooled to minus 50 C. Ten (10) ml of a 1M solution of boron trichloride in hexanes is added.

23.6 g (0.2 mole) of the monomer alpha-methylstyrene are then added slowly and continuously. After six hours, the reaction is quenched with methanol, and the oligomer (oligo-alpha-methylstyrene) precipitated by pouring the solution into methanol. Each dibromobenzene monomer will have a side chain of an average length of about 20 styrene units (MW 2000. Different-length side chains may be prepared by adding different ratios of styrene to dibromobenzylbromide.

EXAMPLE IV

1,4-Dibromo-2-(oligoisobutyl vinyl ether)-benzene (quasi-living cationic polymerization)

The dibromobenzyl cation is prepared by adding 3.4 g silver hexafluoroantimonate ($AgSbF_6$) to a cold ($-70°$ C.) solution of 3.3 g (0.01 mole) of 2,5-dibromobenzylbromide, in dichloromethane. Isobutyl vinyl ether (50 g [65 ml, 0.5 mole]) is introduced slowly and continuously. The reaction is quenched and the oligomer (oligoisobutyl vinyl ether) recovered by the addition of alcohol. Other non-limiting examples of side chains which can be produced by quasi-living cationic polymerization include: oligomethyl vinyl ether, oligoisobutene, oligo-p-t-butylstyrene, oligoindene, and oligostryene.

2,5-Dibromobenzylbromide 33 g (0.1 mole) 2,5-dibromo toluene is placed in a 100 ml three-necked flask, fitted with a reflux condenser, a sealed mechanical stirrer, and a separatory funnel with the stem reaching nearly to the bottom of the flask. The flask is illuminated with two 300-watt tungsten lamps during the reaction. The flask is heated in an oil bath to 150.C, and 18.4 g (5.9 ml, 0.115 mole) bromine is added over two hours. The mixture is stirred for an additional 10 minutes, and the contents, while still liquid, are poured into a 500 ml round-bottom flask containing 300 ml of hot light petroleum ether and 2 g decolorizing carbon. A reflux condenser is attached, and the mixture is heated to reflux until the material dissolves, then rapidly filtered through a pre-heated Buchner funnel. The filtrate is cooled and washed with cold light petroleum.

EXAMPLE V

Co-polymerization of 1,4-dibromo-2-(oligo-alpha-methyl-styrene)-benzene and 1,4-dibromobenzene (copolymer product)

To a solution containing 0.029 g (0.020 mole) magnesium powder (which is activated by washing in dilute HCl and then water, dried, and then stirred in the presence of iodine overnight) in 10 ml tetrahydrofuran is added a solution of 2.0 g (0.001 mole) 1,4-dibromo-2-(oligo-alpha-methylstyrene)-benzene and 4.7 g (0.02 mole benzene in 30 ml tetrahydrofuran under argon. After stirring the mixture at room temperature for one hour, 0.050 g (0.00018 mole) $NiCl_2$ bipyridine is added to the solution. The final mixture is heated and allowed to reflux for 24 hours. Any solid p-polyphenylene is removed by filtration. The filtrate is poured into 200 ml of ethanol and the copolymer product precipitated. The copolymer product is collected, washed with water, and dried.

EXAMPLE VI

The copolymerization of 1,4-dibromo-2-(oligoisobutyl vinyl ether) benzene and 1,4-dibromobenzene is accomplished in a manner similar to Example V above.

EXAMPLE VII

2-[oligo-(phenoxyphenylketone)1-terephthalic acid, Monomer 10

Side chain synthesis

A solution of 9.5 g (0.1 mole) phenol, 173 g (0.8 mole) 4-fluoro-4'-hydroxybenzophenone, and 55 g (0.4 mole, 0.8 equiv.) potassium carbonate in 600 ml dimethyl sulfoxide is heated to 150° C. for 6 hours. The mixture is then slowly poured into 1 liter of water; the precipitated polymer (PEK-OH) is separated from the liquid phase, rinsed with methanol, and dried under vacuum to produce oligo-(phenoxyphenyl ketone).

Monomer synthesis 200 ml dimethyl sulfoxide is used to dissolve 76 g of PEK-OH, 10.5 g (0.05 mole) nitroterephthalic acid diethyl ester, and 14 g (0.1 mole) potassium carbonate. The solution is heated to 130° C. for 6 hours. After cooling, a solution of 4 g NaOH in 25 ml water is added. The mixture is heated to 100° C. for 2 hours. The solvent is then removed under vacuum, and the residue is washed with water followed by ethanol, and dried to yield 2-[oligo-(phenoxyphenyl ketone)]-terephthalic acid, Monomer 10.

EXAMPLE VIII

2-[oligo-(2,6-dimethylphenoxy)1-terephthalic acid, Monomer 11

Side chain synthesis

A solution of 200 ml of nitrobenzene, 70 ml pyridine and 1 g copper (I) chloride is vigorously stirred while oxygen is bubbled through it at a rate of 100 ml/minute. Then 15 g (0.12 mole) 2,6-dimethylphenol is added, and the reaction is continued for 5 minutes, then it is diluted with 100 ml chloroform and added to 1 liter of methanol containing 3 ml of concentrated hydrochloric acid. The resulting oligo-(2,6-dimethylphenoxy) polymer is thoroughly rinsed and dried.

Monomer synthesis

A solution of 192 g (ca. 0.1 mole) polydimethylphenylene oxide in 700 ml dimethyl sulfoxide is treated with 21 g (0.1 mole) nitro-terephthalic acid diethyl ester and 14 g (0.1 mole) potassium carbonate at 130° C. for 6 hours. After cooling, a solution of 4 g NaOH in 25 ml water is added. The mixture is heated to 100° C. for 2 hours. The solvent is removed under reduced pressure. The residue is thoroughly washed with water, rinsed with ethanol, and dried under vacuum to yield 2-[oligo-(2,6-dimethylphenoxy)]-terephthalic acid, Monomer 11.

EXAMPLE IX

Co-Polybenzobisthiazole from Monomer 10, Terephthalic acid and 2,5-diamino-1,4-benzenedithiol A mixture of 33 g (20 mmoles) Monomer 10 of Example VII, 33 g (200 mmoles) terephthalic acid, and 54 g (220 mmoles) 2,5-diamino-1,4-benzenedithiol dihydrochloride in 77% 700 ml polyphosphoric acid is heated to 70°-90° C. under reduced nitrogen pressure (60 mm Hg) (to facilitate removal of hydrogen chloride). After complete dehydrochlorination, phosphorus pentoxide is added under reduced pressure to provide 84%–86% polyphosphoric acid. The temperature is then raised to 170° C. for 20 hours, and finally to 190° C. for four hours. The paraphenylene[unsubstituted and 2-oligo(-phenoxyphenylketone)substituted]-2-benzobisthiazole copolymer is isolated by precipitation into water and washed with refluxing water until all the phosphoric acid is removed. The isolated copolymer is then rinsed with alcohol and dried in vacuo. The copolymer has side chains on every tenth main chain monomer unit, on the average. The side chain constitutes 38% of the polymer, by weight, while the backbone accounts for the balance, 62%, of the polymer weight.

EXAMPLE X

Copolymerization from Monomer 10, Terephthalic Acid and 2,5-Diamino-1,4-Dihydroxybenzene Paraphenylene[unsubstituted and oligo-(phenoxyphenyl ketone)substituted]-2-benzobisoxazoles are prepared in accordance with the method of Example IX using 2,5-diamino-1,4-dihydroxybenzene in place of the benzenedithiol of Example IX.

EXAMPLE XI

Co-Polybenzobisthiazole from Monomer 11, Terephthalic Acid and 2,5-diamino-1,4-benzenedithiol A mixture of 4 g (ca. 20 mmoles) Monomer 11 of Example VIII, 10 g (60 mmoles) terephthalic acid, and 19.6 g (80 mmoles) 2,5-diamino-1,4-benzenedithiol dihydrochloride in 450 ml 77% polyphosphoric acid is heated to 70°–90° C. under reduced nitrogen pressure (60 mm dehydrochlorination, phosphorus pentoxide is added under reduced pressure to provide 84%–86% polyphosphoric acid. The temperature is then raised to 170° C. for 20 hours, and finally to 190° C. for four hours. The paraphenylene[unsubstituted and 2-oligo-(2,6-dimethylphenoxy)substituted]-2-benzobisoxazole copolymer is isolated by precipitation into water and washed with refluxing water until all the phosphoric acid is removed. The isolated copolymer is then rinsed with alcohol and dried in vacuo. The copolymer so obtained has side chains on every fourth main chain unit, on the average. The side chain constitutes 67% of the polymer, by weight; the backbone accounts for the remaining 33% of the weight of the polymer.

EXAMPLE XII

Copolymerization from Monomer 11, Terephthalic Acid and 2,5-Diamino-1,4-Dihydroxybenzene Paraphenylene[unsubstituted and 2-oligo-(2,6-dimethyl-phenoxy)substituted]-2-benzobisoxazole are prepared in accordance with the method of Example XI using 2,5-diamino-1,4-dihydroxybenzene in place of the benzene dithiol of Example XI.

EXAMPLE XIII

Poly-p-phenylene-co-2-oligoisophenyl-1,4-phenylene

2'-acetyl-4,4"-dibromoterphenyl

To 3.8 (0.01 mole) 4,4"-dibromoterphenyl in 200 ml nitrobenzene is added 0.86 g (0.011 mole) acetyl chloride and 1.46 g (0.011 mole) aluminum trichloride. The mixture is heated to 80° C. under inert atmosphere for three hours. The mixture is cooled to room temperature and washed with 1 m HCl. The organic layer of 2'-acetyl-4,4"-dibromoterphenyl is separated and the solids filtered and washed with several portions of ethanol, and dried.

Semitelechelic polyisoprene; 4,4"-dibromo-2'-oligoisoprenylterphenyl

A solution of living oligoisoprenyllithium is prepared following S. Dumas, J. Sledz and F. Schue, "Anionic Polymerization," J. E. McGrath, Ed., ACS Symposium Series 166, Chapter 29, pp. 463–475, 1981. To a solution of isoprene (0.7 mmole) in 1 liter cyclohexane held at 18° C. is added t-butyl lithium (0.4 mmole) After four hours, the reaction is terminated by adding 2'-acetyl-4"-dibromoterphenyl (0.05 mmole). The solvent is removed and the solid 4,4"-dibromo-2'-oligoisoprenylterphenyl collected.

Poly-p-phenylene-co-2-oligoisphenyl-1,4-phenylene

A solution containing 0.029 g 0.020 mole) magnesium powder (which is activated by washing in dilute HCl and then water, dried, and then stirred in the presence of iodine overnight) in 10 ml tetrahydrofuran is added to a solution of 1.0 g (0.001 mole) 4,4"-dibromo-2'-oligoisoprenylterphenyl and 4.7 g (0.02 mole) 1,4-dibromobenzene in 50 ml tetra-hydrofuran under argon. After stirring the mixture at room temperature for one hour, 0.050 g (0.0018 mole) NiCl$_2$ bipyridine is added to the solution. The final mixture is heated and allowed to reflux for 24 hours. Any solid p-polyphenylene is removed by filtration. The filtrate is poured into 200 ml ethanol and the poly-p-phenylene-co-2-oligoisoprenyl-1,4-phenylene polymer precipitated. The polymer is collected, washed with water, and dried.

EXAMPLE XIV 4,4"-Dinitro-p-terphenyl, 1 p-terphenyl (200g, 0.87 mole) is stirred with 2 liters of acetic anhydride at 0° C., and fuming nitric acid (d 1.5, 90 ml) is added dropwise during 30 minutes. Stirring is continued at 0° C. for a further 30 minutes. The temperature is allowed to rise to 20° C., and then maintained at 45°–50° C. for one hour. The 4,4"-dinitro-p-terphenyl 1 is separated as yellow needles, m.p. 272°–273° C. in 65% yield. 4,4"-Dinitro-2'-butyl-p-terphenyl, 2

A three-liter neck flask is adapted with a condenser with desiccant tube atop, addition funnel with pressure equalizer tube, and mechanical stirrer. A mixture of (160 g, 0.5 mole) aluminum chloride (67 g, 0.5 mole), and nitrobenzene (1.5 liters) is placed in the flask and is then warmed to 75° C., after which 1-chlorobutane (46 g, 0.5 mole) is added to the mixture from the addition funnel. After the addition has been completed, the mixture is stirred at 75° C. for a further one hour, and then cooled to room temperature. The contents of the flask are then poured over an ice-water-hydrochloric mixture (ca. 1 liter, 1–250 ml) and vigorously stirred until the ice melts completely. The aqueous phase is discarded and the organic phase is washed sequentially with water (1.5 liters) and a saturated solution of sodium bicarbonate (1.5 liters). The organic phase is then dried and the nitrobenzene is partially removed by reduced pressure distillation and the 4,4"-dinitro-2'-butyl-p-terphenyl product is finally recovered by precipitation with hexane.

4,4"-Dinitro-p-terphenyl-2'-carboxylic acid, 3

A mixture of 2 (113 g, 0.3 mole), potassium permanganate (95 g, 0.6 mole), 18-crown-6 (80 g, 0.3 mole), and benzene (1.2 liters) is refluxed for 30 minutes. The mixture is then treated with concentrated hydrochloric acid (500 ml) to dissolve inorganic oxides. The organic phase is washed with water until rendered neutral, dried with magnesium sulfate, and then the solvent is removed under reduced pressure to yield 4,4″-dinitro-p-terphenyl-2′-carboxylic acid.

4,4″-Dinitro-p-terphenyl-2′-acyl chloride, 4

A mixture of 3 (73 g, 0.2 mole) and thionyl chloride (400 ml) is gently heated to the boiling point. The mixture is maintained at the reflux temperature for an additional one hour, after which the bulk of the thionyl chloride is decanted. The residual thionyl chloride is then removed under reduced pressure to yield 4,4″-dinitro-p-terphenyl-2′-acyl chloride.

Poly-epsilon-caorolactam 5

Epsilon-caprolactam (50 g) and 2.0 g of a 50% weight-percent aqueous solution of piperidine are placed in a large test tube fitted with gas inlet and outlet tubes. The tube is swept with nitrogen and then immersed in a vapor bath at 280° C. After one hour, the test tube is removed from the bath and allowed to cool to room temperature, under nitrogen. The test tube is broken and the polymer is broken down to small particles (about 1 mm or less). The polymer is freed from impurities by extracting them with water in a Soxhlet extractor. The polymer is then dried at 100° C. under reduced pressure to yield poly-epsilon-caprolactam.

4,4″-Dinitro-p-terphenyl-2′-(poly-epsilon-caprolactam), 6

A mixture of 4 (38 g, 0.1 mole) and 5 (1.1 kg, 0.1 mole) in pyridine (300 ml) and m-cresol (3 liters) is vigorously stirred at 5° C. for 30 minutes, after which the mixture is slowly allowed to warm to room temperature, and stirred an additional 30 minutes. The solvent is then removed under reduced pressure and the monomer is thoroughly rinsed with water, followed by drying at 100° C. under reduced pressure to yield 4,4″-dinitro-p-terphenyl-2′-(poly-epsilon-caprolactam).

4.4″-Diamino-p-terphenyl-2′-(poly-epsilon-caorolactam), 7

In a three-necked flask, fitted with a reflux condenser and a mechanical stirrer, are placed 6 (54 g, ca. 10 moles), iron (3.4 g, 60 mmoles), and ethyl alcohol 50% (by weight). The mixture is heated to boiling on a water bath, and a solution of concentrated hydrochloric acid (0.4 ml, 5 moles) in about 5 ml of 50% (by weight) ethyl alcohol is added slowly. The mixture is refluxed for two hours after addition of the acid is complete. At the end of this time, the hot mixture is made just alkaline to litmus by the addition of 15% alcoholic potassium hydroxide solution. The iron is removed by filtration from the warm solution. The 4,4″-diamino-p-terphenyl-2′-(poly-epsilon-caprolactam) product is then isolated by crystallization at low temperature from the ethanol solution.

POLYIMIDE, 8

In a nitrogen-purged flask adapted with a mechanical stirrer is placed 7 (54 g, ca. 10 moles) in 500 ml dry dimethylacetamide. Pyromellitic dianhydride (440 mg, 10 moles) is then added to the flask through a funnel. The flask is closed and the mixture is stirred for one hour. The polyamic acid solution is formed into thin layers by drawing onto dry glass plates and dried for 20 minutes in a forced-draft oven (with nitrogen bleed) at 80° C. These polyamic acid films are clamped to frames and carefully heated in a forced-draft oven to 300° C. for 60 minutes, and then heated at 300° C. for an additional hour to yield polyimide films of 4,4″-diamino-p-terphenyl-2′-(poly-epsilon-caprolactam) and pyromellitic dianhydride.

EXAMPLE XV

Poly-p-(N,N-dimethylamidophenylene)

Dry nickel chloride (60 mg, 0.46 mmole), triphenylphosphine (0.917 g, 3.5 mmole), 2,2′-bipyridine (64.7 mg, 0.41 mmole), sodium iodide (0.39 g, 1.44 mmole), and zinc powder (0.92 g, 14.1 mmole) were placed into a 100 ml round-bottom flask. The flask and its contents were heated to 50° C. for 90 minutes under dynamic vacuum to remove trace water. Evacuation was discontinued, and argon was admitted to the flask. Dry dimethylformamide (DMF) (8 ml) was added, and the temperature was raised to 80° C. Within 5 minutes, the mixture turned a deep-red color. After stirring for 20 minutes under argon, a solution of 2,5-dichloro-N,N-dimethylbenzamide (2.016 g, 9.1 mmole) in DMF (5 ml) was added. After 2 hours, the mixture was cooled to room temperature, then poured into 200 ml of 15% aqueous HCl and extracted with benzene. The product, as a suspension in benzene, was washed with 5% HCl. Dichloromethane was added to the thick, white benzene suspension to give a slightly cloudy solution, which was separated from the remaining water and taken to dryness on a rotary evaporator to give 0.5 g of poly-p-(N,N-dimethylamidophenylene), a white powder.

The poly-p-(N,N-dimethylamidophenylene) monomer repeat unit is:

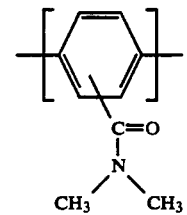

EXAMPLE XVI

Poly-p-(N,N-dimethylamidophenylene)

Anhydrous nickel(II) chloride (60 mg, 0.46 mmole), triphenylphosphine (800 mg, 3.05 mmole), sodium iodide (180 mg, 1.2 mmole), and activated zinc powder (1.2 g, 18 mmole) are placed into a 25 ml flask under an inert atmosphere along with 7 ml of anhydrous N-methylpyrrolidinone (NMP). This mixture is stirred at 50° C. for about 10 minutes, leading to a deep-red coloration. A solution of 2.6 g (11.7 mmole) of 2,5-dichlorobenzamide in 8 ml of anhydrous NMP is then added by syringe. After stirring for about 60 hours, the resulting highly viscous solution is poured into 100 ml of 1 molar hydrochloric acid in ethanol to dissolve the excess zinc metal and to precipitate the polymer. This suspension is filtered, and the precipitate triturated twice with acetone to afford poly-p-(N,N-dimethylamidophenylene). This procedure gives a higher molecular weight polymer than that described in Example XV.

EXAMPLE XVII

Poly-para-benzoylmorpholine

Anhydrous nickel(II) chloride (50 mg, 0.39 mmole), triphenylphosphine (750 mg, 2.86 mmole), sodium iodide (150 mg, 1.0 mmole), and 325 mesh activated zinc powder (1.2 g, 18 mmole) were placed into a 25 ml flask under an inert atmosphere along with 5 ml of anhydrous N-methyl-pyrrolidinone (NMP). This mixture was stirred at 50° C. for about 10 minutes, leading to a deep-red coloration. A solution of 3 g (11.5 mmole) of 2,5-dichlorobenzoylmorpholine (>99% pure by HPLC analysis) in 10 ml of anhydrous NMP was then added by syringe. After stirring for about 60 hours, the resulting highly viscous solution was poured into 100 ml of 1 molar hydrochloric acid in ethanol to dissolve the excess zinc metal and to precipitate the polymer. This suspension was filtered, and the precipitate triturated with acetone to afford, after isolation and drying, 2.2 g (100% yield) of polyparabenzoylmorpholine as a light tan powder. The inherent viscosity of this polymer was measured at 40° C. in NMP and found to be 1.8(1) dL/g, indicative of high molecular weight polymer.

The poly-para-benzoylmorpholine monomer repeat unit is:

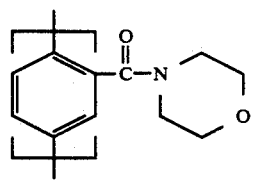

EXAMPLE XVIII

Poly-para-benzoylpiperidine

Anhydrous nickel(II) chloride (60 mg, 0.46 mmole), triphenylphosphine (800 mg, 3.05 mmole), sodium iodide (180 mg, 1.2 mmole), and 325 mesh activated zinc powder (1.2 g, 18 mmole) were placed into a 25 ml flask under an inert atmosphere along with 5 ml of anhydrous N-methyl-pyrrolidinone (NMP). This mixture was stirred at 50° C. for about 10 minutes, leading to a deep-red coloration. A solution of 3 g (11.5 mmole) of 2,5-dichlorobenzoylpiperidine (>99% pure by HPLC analysis) in 10 ml of anhydrous NMP was then added by syringe. After stirring for about 60 hours, the resulting highly viscous solution was poured into 200 ml of 1 molar hydrochloric acid in ethanol to dissolve the excess zinc metal and to precipitate the polymer. This suspension was filtered, and the precipitate triturated with acetone to afford, after isolation and drying, 2.2 g (100% yield) of polyparabenzoylpiperidine as a pale yellow powder. The inherent viscosity of this polymer was measured at 40° C. in NMP and found to be 1.2(1) dL/g, indicative of high molecular weight polymer.

The poly-para-benzoylpiperidine monomer repeat unit is:

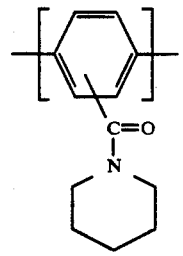

EXAMPLE XIX

Poly-para-bi(2,2'-benzoylmorpholine)

Anhydrous nickel(II) chloride (50 mg, 0.39 mmole), triphenylphosphine (750 mg, 2.86 mmole), sodium iodide (150 mg, 1.0 mmole), and 325 mesh activated zinc powder (1.2 g, 18 mmole) are placed into a 25 ml flask under an inert atmosphere along with 5 ml of anhydrous N-methyl-pyrrolidinone (NMP). This mixture is stirred at 50° C. for about 10 minutes, leading to a deep-red coloration. A solution of 5 g (9.3 mmole) of 4,4-dibromobi(2,2'-benzoyl-morpholine) in 10 ml of anhydrous NMP is then added by syringe. After stirring for 24 hours, the resulting highly viscous solution is poured into 200 ml of 1 molar hydrochloric acid in ethanol to dissolve the excess zinc metal and to precipitate the polymer. This suspension is filtered, and the precipitate triturated with acetone to afford poly-para-bi(2,2'-benzoylmorpholine).

The poly-para-bi(2,2'-benzoylmorpholine) monomer repeat unit is:

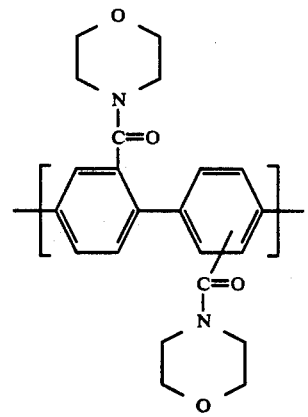

EXAMPLE XX

Poly-2-(oligo-alpha-methylstyrene)-1,4-phenylene

To provide para-bromo-(oligo-alpha-methylstyrene)-benzeneboronic acid monomer, a solution of n-butyllithium (7.8 mmole) in hexane is added dropwise to a solution of 1,4-dibromo-2-(oligo-alpha-methylstyrene)-benzene (from Example III: 20 g, 7.7 mmole) in 200 ml of diethyl ether at −78° C. and subsequently allowed to warm to room temperature. This mixture is then quenched into a solution of trimethylborate (2.5 g, 24 mmole) in 200 ml of diethyl ether at −78° C. and allowed to warm to room temperature over an 8–12 hour period. Acidic hydrolysis and aqueous workup followed by concentration and precipitation of the monomer with hexane affords para-bromo-(oligo-alpha-methyl-styrene)-benzeneboronic acid.

A mixture of para-bromo-(oligo-alpha-methylstyrene)benzeneboronic acid (15 g, 5.8 mmole), tetrakis(triphenylphosphine)palladium (65 mg, 0.056 mmole), benzene (100 ml), and aqueous sodium carbonate (2M, 25 ml) is refluxed under an inert atmosphere for 48 hours. Quenching the reaction into 200 ml of acetone leads to precipitation of poly-2-(oligo-alpha-methyl-styrene)-1,4-phenylene, which can be isolated by filtration.

EXAMPLE XXI

Poly-2-(oligoisobutyl vinyl ether)-1.4-phenylene

Anhydrous nickel(II) chloride (50 mg, 0.39 mmole), triphenylphosphine (750 mg, 2.86 mmole), sodium iodide (150 mg, 1.0 mmole), and 325 mesh activated zinc powder (1.2 g, 18 mmole) are placed into a 100 ml flask under an inert atmosphere along with 5 ml of anhydrous N-methyl-pyrrolidinone (NMP). This mixture is stirred at 50° C. for about 10 minutes, leading to a deep-red coloration. This catalyst mixture is then added to a solution of 50 g (10 mmole) of 1,4-dibromo-2-(oligoisobutyl vinyl ether)-benzene from Example IV in 100 ml of anhydrous NMP. After stirring for 48 hours, the resulting highly viscous solution is poured into 500 ml of 1 molar hydrochloric acid in ethanol to dissolve the excess zinc metal and to precipitate the polymer. This suspension is filtered, and the precipitate triturated with acetone to afford poly-2-(oligoisobutyl vinyl ether)-1,4-phenylene.

EXAMPLE XXII

Poly-para-benzenesulfonylmorpholine

Anhydrous nickel(II) chloride (60 mg, 0.46 mmole), triphenylphosphine (800 mg, 3.05 mmole), sodium iodide (180 mg, 1.2 mmole), and activated zinc powder (1.2 g, 18 mmole) are placed into a 25 ml flask under an inert atmosphere along with 7 ml of anhydrous N-methylpyrrolidinone (NMP). This mixture is stirred at 50° C. for about 10 minutes, leading to a deep-red coloration. A solution of 3.4 g (11.5 mmole) of 2,5-dichlorobenzenesulfonylmorpholine, which is prepared by the reaction of 2,5-dichlorobenzenesulfonyl chloride with morpholine, in 8 ml of anhydrous NMP is then added by syringe. After stirring for 60 hours, the resulting highly viscous solution is poured into 100 ml of 1 molar hydrochloric acid in ethanol to dissolve the excess zinc metal and to precipitate the polymer. This suspension is filtered and triturated with acetone to afford, after isolation and drying, solid polyparabenzenesulfonylmorpholine.

The polyparabenzenesulfonylmorpholine monomer repeat unit is:

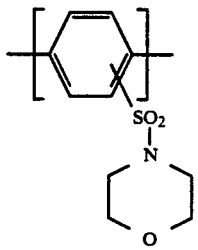

EXAMPLE XXIII

Poly-para-benzenesulfonylpiperidine

Anhydrous nickel(II) chloride (60 mg, 0.46 mmole), triphenylphosphine (800 mg, 3.05 mmole), sodium iodide (180 mg, 1.2 mmole), and activated zinc powder (1.2 g, 18 mmole) are placed into a 25 ml flask under an inert atmosphere along with 7 ml of anhydrous N-methylpyrrolidinone (NMP). This mixture is stirred at 50° C. for about 10 minutes, leading to a deep-red coloration. A solution of 3.4 g (11.6 mmole) of 2,5-dichlorobenzenesulfonylpiperidine, which is prepared by the reaction of 2,5-dichlorobenzenesulfonyl chloride with piperidine, in 8 ml of anhydrous NMP is then added by syringe. After stirring for about 60 hours, the resulting highly viscous solution is poured into 200 ml of 1 molar hydrochloric acid in ethanol to dissolve the excess zinc metal and to precipitate the polymer. This suspension is filtered and triturated with acetone to afford, after isolation and drying, solid polyparabenzenesulfonylpiperidine.

The polyparabenzenesulfonylpiperidine monomer repeat unit is:

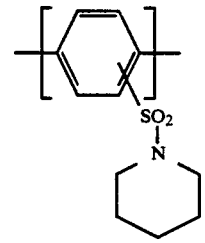

EXAMPLE XXIV

Copolymer of 4,4'-dibromobi-(2,2'-benzoylmorpholine) and paradichlorobenzene

Anhydrous nickel(II) chloride (60 mg, 0.46 mmole), triphenylphosphine (800 mg, 3.05 mmole), sodium iodide (180 mg, 1.2 mmole), and activated zinc powder (1.2 g, 18 mmole) are placed into a 25 ml flask under an inert atmosphere along with 5 ml of anhydrous N-methylpyrrolidinone (NMP). This mixture is stirred at 50° C. for about 10 minutes, leading to a deep-red coloration. A solution of 1 g (1.9 mmole) of 4,4'-dibromobi-(2,2'-benzoylmorpholine) in 5 ml of anhydrous NMP is then added by syringe. A solution of 1.5 g (10.2 mmole) of paradichlorobenzene in 10 ml of anhydrous NMP is added slowly, dropwise, to the reaction mixture over a period of 24 hours to prevent formation of unsubstituted, insoluble polyparaphenylene oligomers. After stirring for about 60 hours, the resulting highly viscous solution is poured into 200 ml of 1 molar hydrochloric acid in ethanol to dissolve the excess zinc metal and to precipitate the polymer. This suspension is filtered and the precipitate triturated with acetone to afford, after isolation and drying, solid poly-para-bi(2,2'-benzoylmorpholine)/polyparaphenylene copolymer.

The above descriptions of exemplary embodiments of processes for producing rigid-rod polymers, and the rigid-rod polymers produced by the processes, are for illustrative purposes. Because of variations which will be apparent to those skilled in the art, the present invention is not intended to be limited to the particular embodiments described above. The scope of the invention is defined in the following claims.

What is claimed is:
1. A polymer comprising:
   (a) a rigid-rod backbone comprising a chain of at least 25 organic monomer units joined together by covalent bonds wherein at least about 95% of the bonds are substantially parallel; and
   (b) Pendant solubilizing organic groups having a molecular weight of at least about 300 attached to at least 1% of the monomer units.
2. The polymer of claim 1 wherein the solubilizing groups are $C_{22}$ alkyl groups.
3. The polymer according to claim 1 wherein the polymer is a homopolymer.
4. The polymer according to claim 3 wherein the monomer unit has the following formula:

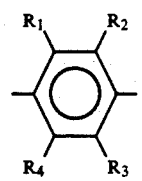
IA wherein $R_1$, $R_2$, $R_3$, and $R_4$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of $R_1$, $R_2$, $R_3$, and $R_4$ is other than hydrogen, and provided that the molecular weight of at least one of $R_1$, $R_2$, $R_3$, and $R_4$ is at least 300.

5. The polymer according to claim 3 wherein the monomer unit has the following formula:

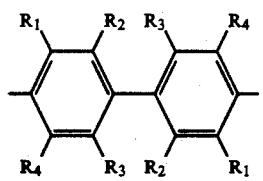
IIA wherein $R_1$, $R_2$, $R_3$, and $R_4$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of $R_1$, $R_2$, $R_3$, and $R_4$ is other than hydrogen, and provided that the molecular weight of at least one of $R_1$, $R_2$, $R_3$, and $R_4$ is at least 300.

6. The polymer according to claim 3 wherein the monomer unit has the following formula:

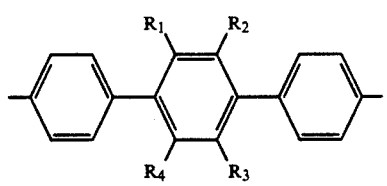
IIIA wherein $R_1$, $R_2$, $R_3$, and $R_4$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of $R_1$, $R_2$, $R_3$, and $R_4$ is other than hydrogen, and provided that the molecular weight of at least one of $R_1$, $R_2$, $R_3$, and $R_4$ is at least 300.

7. The polymer according to claim 3 wherein the monomer unit has the following formula:

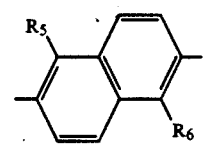
VIA wherein $R_5$ and $R_6$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of $R_5$ and $R_6$ is other than hydrogen, and provided that the molecular weight of at least one of $R_5$ and $R_6$ is at least 300.

8. The polymer according to claim 3 wherein the monomer unit has the following formula:

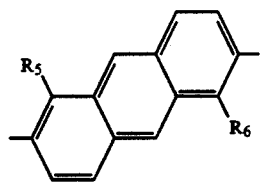
VIIA wherein $R_5$ and $R_6$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of $R_5$ and $R_6$ is other than hydrogen, and provided that the molecular weight of at least one of $R_5$ and $R_6$ is at least 300.

9. The polymer according to claim 3 wherein the monomer unit has the following formula:

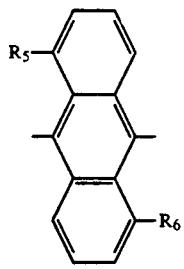

VIIIA

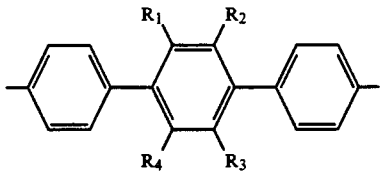

IIIA

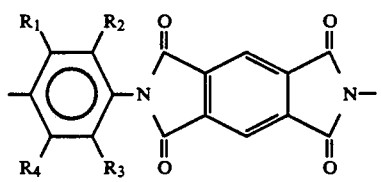

IVA

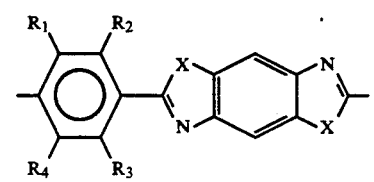

VA

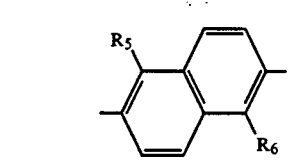

VIA

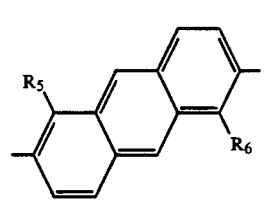

VIIA

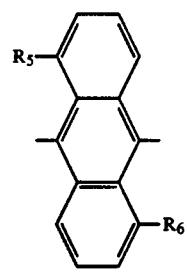

VIIIA wherein $R_5$ and $R_6$ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinylchloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of $R_5$ and $R_6$ is other than 10. The polymer according to claim 1 wherein at least one out of every 100 monomer units has pendant solubilizing organic groups.

11. The polymer according to claim 1 wherein the molecular weight fraction of the solubilizing organic groups to the whole polymer is from about 30% to about 95%.

12. The polymer according to claim 1 wherein the molecular weight fraction of the solubilizing organic groups to the whole polymer is from about 30% to about 60%.

13. The polymer according to claim 1 wherein the molecular weight fraction of the solubilizing organic groups to the whole polymer is from about 45% to about 55%.

14. A polymer comprising a rigid-rod backbone comprising a chain of at least 25 organic monomer units joined together by covalent bonds wherein at least about 95% of the bonds are substantially parallel, wherein at least 1% of the monomer units have pendant solubilizing organic groups having a molecular weight of at least about 300 attached thereto, and wherein at least a portion of the monomer units are selected from the group of the following formulae:

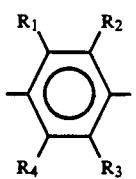

IA

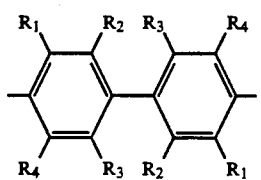

IIA

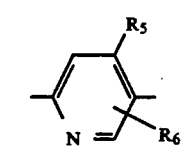

IXA

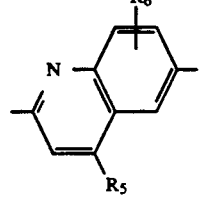

XA

-continued

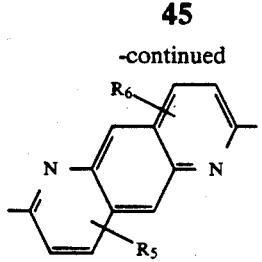

XIA

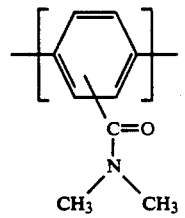

wherein

R₁, R₂, R₃, and R₄ can be the same or different and are hydrogen, alkyl, aryl, alkaryl, aralkyl, alkyl or aryl amide, acyl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, and poly(phenoxyphenyl ketone), provided that at least one of R₁, R₂, R₃, and R₄ is other than hydrogen, and provided that the molecular weight of at least one of R₁, R₂, R₃, and R₄ is at least 300, and wherein R₅ and R₆ can be the same or different and are hydrogen, alkyl, aryl, alkaryl, aralkyl, alkyl or aryl amide, aryl ketone, alkoxy, polyalkeneoxy, polyphenylene oxide, polyphenylene sulfide, polyvinyl chloride, polyalkylmethacrylate, polyacrylonitrile, polyalkylvinyl ether, polyvinyl alcohol, polyvinyl acetate, perfluoroalkyl, perfluoroalkoxy, polypolyester, polyamide, polyimide, and poly(phenoxyphenyl ketone), provided that at least one of R₅ and R₆ is other than hydrogen, and provided that the molecular weight of at least one of R₅ and R₆ is at least 300; and X is NH, O, or S.

15. A polymer comprising a backbone of at least 25 organic monomer units comprising:
   (a) a plurality of paraphenylene monomer units joined together by carbon-carbon covalent bonds wherein at least about 95% of the bonds are substantially parallel, the polymer and its monomer starting materials being soluble in a common solvent system; and
   (b) a plurality of solubilizing organic groups pendant from the monomers, the number and size of the solubilizing organic groups being sufficient to render the polymer soluble in the polymerization solvent system.

16. A polymer as claimed in claim 15 wherein the rigid-rod backbone is comprised of at least one of the following groups: polyparaphenylene, polyparabiphenylene, polyparaterphenylene, poly(1,4-naphthalene), poly(1,4-anthracene), poly(9,10-anthracene), and poly(2,5-pyridine).

17. A polymer as claimed in claim 15 wherein the molecular weight of each of the solubilizing organic groups is greater than about 15.

18. A polymer as claimed in claim 15 wherein the solubilizing organic groups are selected from the group consisting of alkyl amide, aryl amide, alkyl ester, and aryl ester.

19. A homopolymer as claimed in claim 15 wherein the structure poly-p-(N,N-dimethylamidophenylene) where the monomer repeat is:

20. The polymer according to claim 15 wherein the solubilizing organic groups are alkyl, aryl, alkaryl, aralkyl, alkoxy, alkyl amide, aryl amide, polyalkeneoxy, polyphenylene oxide, polyphenylene sulfide, poly(phenoxyphenyl ketone), polyvinyl chloride, polyalkylmethacrylate, polyacrylonitrile, polyvinyl alcohol, polyvinyl acetate, perfluoroalkyl, perfluoroalkoxy, polyester, polyimide, polyamide, and poly(phenoxyphenyl ketone).

21. The polymer according to claim 15 wherein the polymer backbone has at least about 100 paraphenylene monomer units.

22. The polymer of claim 15 wherein the solubilizing side groups are selected from the group consisting of phenyl, naphthyl, anthracyl, and polyphenylene.

23. The polymer of claim 15 wherein the solubilizing organic group is the alkoxy organic group hexadecyloxy.

24. The polymer of claim 15 wherein the solubilizing group

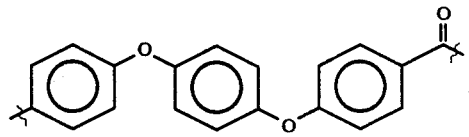

25. The polymer of claim 15 wherein the solubilizing group

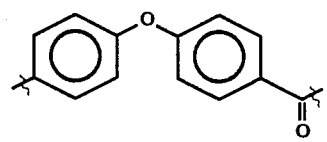

26. A polyparaphenylene polymer provided in accordance with claim 15 wherein the solubilizing organic groups are hydroxy groups.

27. A polymer provided in accordance with claim 15 wherein the solubilizing groups are amino groups.

28. A polymer comprising:
   (a) a rigid-rod backbone selected from the group consisting of polyparaphenylene, polyparabiphenylene, polyparaterphenylene, poly(2,6-naphthylene), poly-(2,6-anthracenyl), poly(9,10-anthracenyl), poly(2,6-quinoline), poly(2,6-quinazolene), poly(paraphenylene-2,2'-benzobisthiazole), poly(paraphenylene-N,N'-benzobisimidazole), poly(paraphenylene-1-pyromellitimide),poly(1,4-naphthylene), poly(1,5-naphthylene), poly(1,4-anthracenyl), poly(1,10-anthracenyl),poly(1,5-anthracenyl), and poly(2,5-pyridinyl), wherein the monomer units are joined together by covalent bonds, about 95% of the bonds being substantially parallel to each other; and (b) organic groups pending from at least 1% of backbone monomers wherein the organic groups have a molecular weight of at least about 300.

29. The polymer of claim 28 comprising at least 100 organic monomer units.

30. A polymer comprising a backbone comprising at least 100 paraphenylene monomer units joined together by carbon-carbon covalent bonds wherein at least about 95% of the bonds are substantially parallel.

31. The polymer according to claim 30 wherein the molecular weight of the polymer is at least about 10,850.

32. A polymer comprising:
(a) a rigid-rod backbone comprising a chain of at least 25 organic monomer units joined together by covalent bonds wherein at least about 95% of the bonds are substantially parallel; and
(b) pendant solubilizing polar organic groups having a molecular weight of at least about 300 and a dielectric constant greater than about 5 attached to at least 1% of the monomer units.

33. A polymer comprising a backbone of at least 25 organic monomer units comprising:
(a) a plurality of paraphenylene monomer units joined together by carbon-carbon covalent bonds wherein at least about 99% of the bonds are substantially parallel, the polymer and its monomer starting materials being soluble in a common solvent system; and
(b) a plurality of solubilizing organic groups pendant from the monomer units, the number and size of the solubilizing organic groups being sufficient to render the polymer soluble in the polymerization solvent system.

34. A polymer comprising a backbone of at least 100 organic monomer units comprising:
(a) a plurality of paraphenylene monomer units joined together by carbon-carbon covalent bonds wherein at least about 95% of the bonds are substantially parallel, the polymer and its monomer starting materials being soluble in a common solvent system; and
(b) a plurality of solubilizing organic groups pendant from the monomers, the number and size of the solubilizing organic groups being sufficient to render the polymer soluble in the polymerization solvent system.

35. A polymer comprising a backbone of at least 100 organic monomer units comprising:
(a) a plurality of paraphenylene monomer units joined together by carbon-carbon covalent bonds wherein at least about 99% of the bonds are substantially parallel, the polymer and its monomer starting materials being soluble in a common solvent system; and
(b) a plurality of solubilizing organic groups pendant from the monomers, the number and size of the solubilizing organic groups being sufficient to render the polymer soluble in the polymerization solvent system.

36. A polymer comprising a rigid crankshaft backbone of at least 25 organic monomer units comprising:
(a) a plurality of arylene monomer units joined together by carbon-carbon covalent bonds wherein at least about 95% of the bonds are substantially parallel, the polymer and its monomer starting materials being soluble in a common solvent system; and
(b) a plurality of solubilizing organic groups pendant from the monomers, the number and size of the solubilizing organic groups being sufficient to render the polymer soluble in the polymerization solvent system.

37. A polymer as claimed in claim 36 wherein the rigid crankshaft backbone is comprised of at least one of the following groups: poly(1,5-naphthalene), poly(2,6-naphthylene), poly(1,5-anthracene), poly(2,6-anthracene), poly(1,10-anthracene), poly(2,6-quinoline), and poly(2,6-quinazolene).

* * * * *

UNITED STATES PATENT AND TRADEMARK OFFICE
CERTIFICATE OF CORRECTION

PATENT NO. : 5,227,457
DATED : July 13, 1993
INVENTOR(S) : M.L. Marrocco III, R.R. Gagné, M.S. Trimmer It is certified that error appears in the above-identified patent and that said Letters Patent is hereby corrected as shown below:

Title page, item
[56] References Cited
OTHER PUBLICATIONS

Page 3, Column 1, Line 31, after "Rehahn et al, "Soluble poly(para-phenylene)s. Ex-" insert from column 2, lines 20-23 -- tension of the Yamamoto synthesis to dibromobenzenes substituted with flexible side chains," Polymer, 30, 1054-1059 (1989). --

The reference should read as follows:
Rehahn et al, "Soluble poly(para-phenylene)s. 1. Extension of the Yamamoto synthesis to dibromobenzenes substituted with flexible side chains," Polymer 30, 1054-1059 (1989).

Page 3, Column 2, Lines 19-23, after "Zembaysashi et al, "Nickel Phosphine Complex-Catalyzed Homo Coupling of Aryl Halides in the Presence" delete "tension of the Yamamoto synthesis to dibromobenzenes substituted with flexible side chains," Polymer, 30, 1054-1059 (1989)." and insert therefor lines 2 and 3 from column 1 -- of Zinc Powder," *Tetrahedron Letters*, 4089-4092 (1977. --

The reference should read as follows:
Zembayashi et al, "Nickel Phosphine Complex-Catalyzed Homo Coupling of Aryl Halides in the Presence of Zinc Powder," *Tetrahedron Letters*, 4089-4092 (1977).

UNITED STATES PATENT AND TRADEMARK OFFICE
CERTIFICATE OF CORRECTION

PATENT NO.  : 5,227,457
DATED       : July 13, 1993
INVENTOR(S) : M.L. Marrocco III, R.R. Gagné, M.S. Trimmer It is certified that error appears in the above-identified patent and that said Letters Patent is hereby corrected as shown below:

Column 4,  line 24,  after "100" insert a period.

Column 6,  line 48,  change "oriori" to -- priori --.

Column 11, line 15,  change "polyadrylonitrile" to
           -- polyacrylonitrile --;

Column 23, line 15,  change "3,3," to -- 3,3' --;
           line 23,  change "bipheny 1,4-organo" to
           -- biphenyl,4-organo --.

Column 25, line 40,  change "metal was" to -- metal were --;
           line 42,  change "monomerrunitssubstituted" to
           -- monomer units substituted --.

Column 26, line 10,  change "forpreparingpoly-" to
           -- for preparing poly- --;
           line 52,  change "weightpolyimides" to
           -- weight polyimides --.

Column 27, line 42,  change "Rigid-rodpolymers" to
           -- Rigid-rod polymers --.

Column 30, lines 20,22, change "0.025 mole)" to
           -- (0.025 mole) --;
           line 24,  change "0.00018 mole)" to
           -- (0.00018 mole) --;

UNITED STATES PATENT AND TRADEMARK OFFICE
CERTIFICATE OF CORRECTION

PATENT NO. : 5,227,457

DATED : July 13, 1993

INVENTOR(S) : M.L. Marrocco III, R.R. Gagné, M.S. Trimmer

It is certified that error appears in the above-identified patent and that said Letters Patent is hereby corrected as shown below:

Column 30, line 50, change "0.025 mole)" to
-- (0.025 mole)" --;
line 50, change "2, -dichlorophenyl" to
-- 2,5-dichlorophenyl --;
line 67, change "50 C" to -- 50°C --.

Column 31, line 8, change "(MW 2000" to -- (MW 2000) --;
line 37, change "150.C" to -- 150°C --;
lines 50 and 60, change "(0.02 mole" to
-- (0.02 mole) --;
line 60, before "benzene" insert
-- 1,4-dibromo --.

Column 32, line 8, after "(phenoxyphenylketone)" change
"1" to -- ] --;
line 34, after "(2,6-dimethylphenoxy)"
change "1" to -- ] --.

Column 33, line 62, after "3.8" insert -- g --.

Column 34, line 11, after "(0.4 mmole)" insert a period;
line 12, change "-acetyl-4''" to
-- -acetyl-4,4'' --;
line 17, change "oligoisphenyl" to
-- oligoisoprenyl --;
line 18, change "0.020 mole)" to
-- (0.020 mole) --;

line 44, put as a heading on a separate line
"4,4''-Dinitro-2'-butyl-p-terphenyl,2";
line 48, before "(160 g, 0.5 mole" insert -- 1 --.

UNITED STATES PATENT AND TRADEMARK OFFICE
CERTIFICATE OF CORRECTION

PATENT NO. : 5,227,457
DATED : July 13, 1993
INVENTOR(S) : M.L. Marrocco III, R.R. Gagné, M.S. Trimmer It is certified that error appears in the above-identified patent and that said Letters Patent is hereby corrected as shown below:

```
Column 35, line 18,   change "caorolactam" to -- caprolactam --;
          line 44,   change "4.4'''" to -- 4,4'' --;
          line 44,45 change "caorolactam" to
                 -- caprolactam --.

Column 36, line 36,   change "(N,N-dimethylamidophenylene" to
                 -- (N,N-dimethylamidophenylene) --.

Column 37, line 52,   change "of2,5" to -- of 2,5 --.

Column 38, line 24,   change "4,4" to -- 4,4' --.

Column 41, line 11,   change "Pendant to -- pendant --.

Column 43, line 23,   after "other than" insert -- hydrogen and
                 provided that the molecular weight of at least
                 one of R₅ and R₆ is at least 300. --

Column 45, line 14,   change "acyl" to -- aryl --.
```

Signed and Sealed this

Eleventh Day of October, 1994

Attest:

BRUCE LEHMAN

Attesting Officer

Commissioner of Patents and Trademarks